US012595854B2

(12) United States Patent
Ramprashad et al.

(10) Patent No.: US 12,595,854 B2
(45) Date of Patent: Apr. 7, 2026

(54) COMPACT HYDRAULICALLY CENTERED THREE-WAY TRANSFER VALVE

(71) Applicant: Hamilton Sundstrand Corporation, Charlotte, NC (US)

(72) Inventors: Sachin Ramprashad, West Hartford, CT (US); Frank Perrelli, East Haven, CT (US); Leo Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 25 days.

(21) Appl. No.: 18/887,647

(22) Filed: Sep. 17, 2024

(65) Prior Publication Data

US 2026/0078828 A1     Mar. 19, 2026

(51) Int. Cl.
    *F16K 11/07*        (2006.01)
    *F15B 13/04*        (2006.01)
    *F15B 13/044*      (2006.01)
    *F15B 20/00*       (2006.01)
    *F16K 31/42*       (2006.01)

(52) U.S. Cl.
    CPC ............ *F16K 11/07* (2013.01); *F15B 13/044* (2013.01); *F15B 20/008* (2013.01); *F16K 31/426* (2013.01)

(58) Field of Classification Search
    CPC .... F16K 11/07; F16K 11/0708; F16K 31/426; F15B 13/044; F15B 20/00; F15B 20/008; F15B 2013/0412
See application file for complete search history.

(56) References Cited

U.S. PATENT DOCUMENTS

| | | | | |
|---|---|---|---|---|
| 5,797,294 A | * | 8/1998 | Bohner | F16H 61/0246 |
| | | | | 477/906 |
| 10,683,943 B2 | | 6/2020 | Kozlowski et al. | |
| 10,711,903 B2 | | 7/2020 | Coretto et al. | |
| 10,866,600 B2 | | 12/2020 | Franzen | |
| 11,035,496 B2 | | 6/2021 | Huff | |
| 11,326,717 B1 | | 5/2022 | Huff | |
| 2013/0048889 A1 | * | 2/2013 | Fujiwara | F16K 11/07 |
| | | | | 137/625.48 |
| 2017/0248251 A1 | * | 8/2017 | Kopp | F15B 13/0435 |
| 2025/0109755 A1 | * | 4/2025 | Coretto | F15B 13/0402 |

* cited by examiner

*Primary Examiner* — Kelsey E Cary

(74) *Attorney, Agent, or Firm* — Kinney & Lange, P.A.

(57)          ABSTRACT

A transfer valve includes a housing. A spool is in the housing and includes a first control surface and a second control surface. A first cavity is formed by the housing and the first control surface. A second cavity is formed by the housing and the second control surface. A first control port connects to the first cavity. A second control port connects to the second cavity. A first centering port is axially between the first control port and the second control port. A second centering port is axially between the first centering port and the second control port. The spool closes the first centering port and the second centering port when in a centered position. The first centering port is connected to the first cavity or the second centering port is connected to the second cavity when the spool is not in the centered position.

20 Claims, 14 Drawing Sheets

1

COMPACT HYDRAULICALLY CENTERED THREE-WAY TRANSFER VALVE

BACKGROUND

The present disclosure relates to transfer valves, and more particularly to transfer valves for use in aerospace actuation systems.

Transfer valves have used springs and/or modulating electro-mechanical interconnect devices (EMIDs) to accomplish a centered position with no hard stop. While these conventional techniques have been considered satisfactory for their intended purpose, there is an ever-present need for improved transfer valves that are lighter and less complex.

SUMMARY

In one example of the disclosure, a transfer valve includes a housing extending axially from a first end to a second end along a center axis of the transfer valve. A spool is in the housing and includes a first control surface facing toward the first end of the housing and a second control surface facing toward the second end of the housing. A first cavity is formed by the housing and the first control surface. A second cavity is formed by the housing and the second control surface. A first control port extends through the housing and is fluidically connected to the first cavity. A second control port extends through the housing and is fluidically connected to the second cavity. A first centering port extends through the housing and is axially between the first control port and the second control port. A second centering port extends through the housing and is axially between the first centering port and the second control port. The spool is configured to block and close the first centering port and the second centering port in a centered position of the spool. The first centering port is fluidically connected to the first control port by the first cavity or the second centering port is fluidically connected to the second control port by the second cavity in a non-centered position of the spool.

In another example of the disclosure, a method is disclosed of operating a transfer valve. The method includes maintaining a spool of the transfer valve in a centered position. Maintaining the spool of the transfer valve in the centered position includes: fluidically connecting a first pressure source to a first control port that is fluidically connected to a first cavity and a first control surface of a spool of the transfer valve; fluidically connecting the first pressure source to a second control port that is fluidically connected to a second cavity and a second control surface of the spool; uncovering a first centering port and fluidically connecting the first cavity to the first centering port when the spool shifts out of the centered position and when the second control surface moves toward the second control port and when the first control surface moves away from the first control port, wherein the first centering port is fluidically connected to a second pressure source that is lower in pressure than the first pressure source; and uncovering a second centering port and fluidically connecting the second cavity to the second centering port when the spool shifts out of the centered position and when the first control surface moves toward the first control port and when the second control surface moves away from the second control port, wherein the second centering port is fluidically connected to the second pressure source.

In another aspect of the disclosure a transfer valve includes a housing extending axially from a first end to a second end along a center axis of the transfer valve. A spool in the housing includes a first control surface facing toward the first end of the housing and a second control surface facing toward the second end of the housing. A first cavity is in the housing and is axially between the first control surface and the first end of the housing. A second cavity is in the housing and is axially between the second control surface and the second end of the housing. A first control port is axially between the first end of the housing and the first control surface and extends through the housing to fluidically connect to the first cavity. A second control port is axially between the second end of the housing and the second control surface and extends through the housing to fluidically connect to the second cavity. A first centering port extends through the housing and is axially between the first control port and the second control port. A second centering port extends through the housing and is axially between the first centering port and the second control port. The spool is configured to block and close the first centering port and the second centering port in a centered position of the spool. The first centering port is fluidically connected to the first cavity or the second centering port is fluidically connected to the second cavity when the spool is not in the centered position.

DETAILED DESCRIPTION

Figure 1:
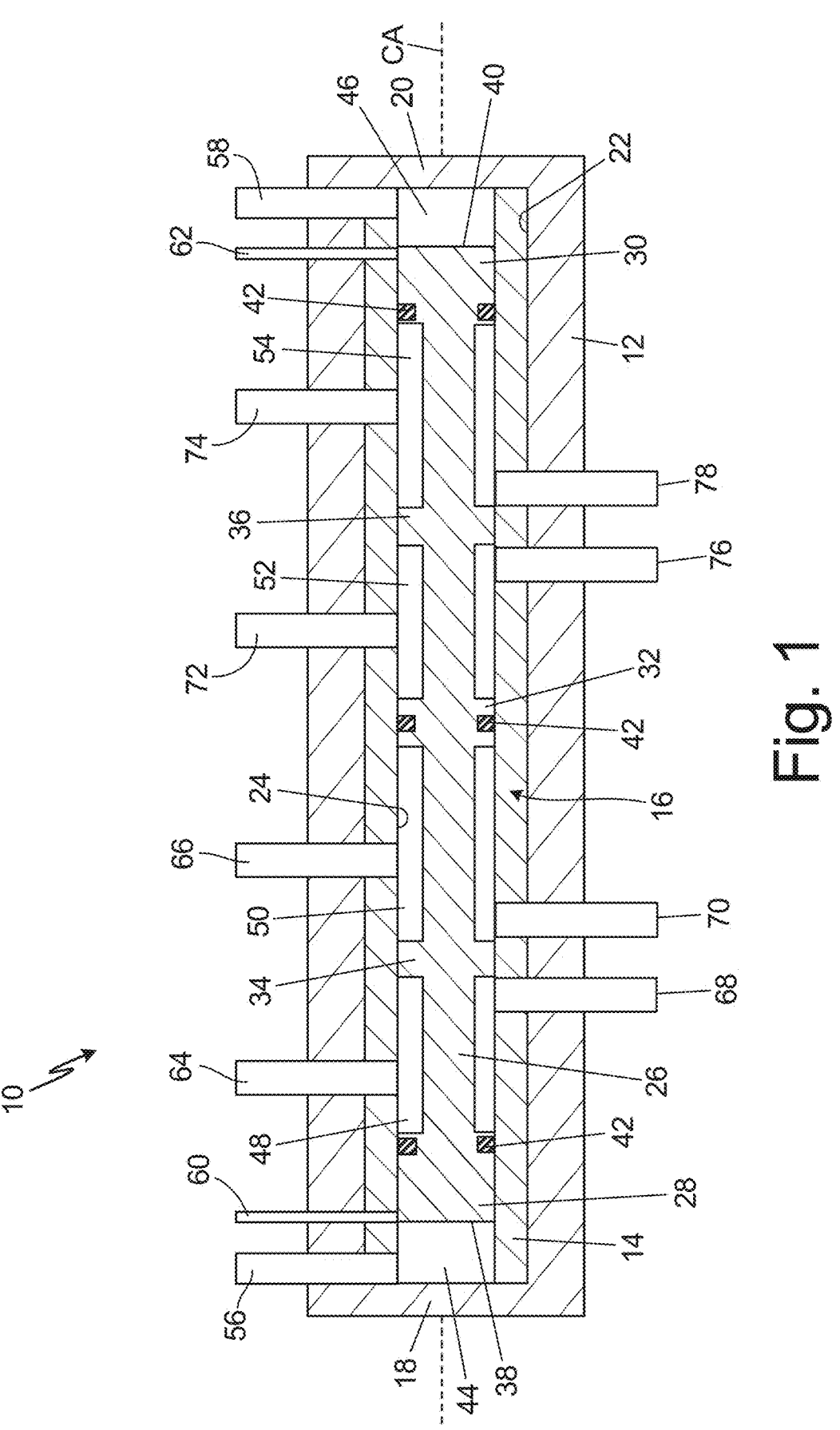
FIG. 1 is a cross-sectional view of one example of a transfer valve with a first centering port, a second centering port, and a spool in a centered position.

FIG. 1 discloses an example of transfer valve 10 in a standby operational mode that allows fluid to flow through transfer valve 10. The example of transfer valve 10 in FIG. 1 includes housing 12, sleeve 14, and spool 16. Housing 12 includes first end 18, second end 20, and inner surface 22. Sleeve 14 includes inside surface 24. Spool 16 includes shaft 26, first land 28, second land 30, third land 32, fourth land 34, and fifth land 36. Spool 16 further includes first control surface 38, second control surface 40, and seals 42. In the example of FIG. 1, transfer valve 10 further includes first cavity 44, second cavity 46, first window 48, second window 50, third window 52, and fourth window 54. The example of transfer valve 10 in FIG. 1 also includes first control port 56, second control port 58, first centering port 60, second centering port 62, first system port 64, second system port 66, first actuator port 68, second actuator port 70, third system port 72, fourth system port 74, third actuator port 76, and fourth actuator port 78.

As shown in the example of FIG. 1, housing 12 extends axially along center axis CA from first end 18 to second end 20. Housing 12 can be hollow and tubular with inner surface 22 extending circumferentially about center axis CA. First end 18 and second end 20 can both be closed, as shown in FIG. 1. Housing 12 can have a diameter that is constant from first end 18 to second end 20. Sleeve 14 is inside housing 12 and is radially inward from inner surface 22 relative to center axis CA. Sleeve 14 extends axially between first end 18 and second end 20 of housing 12, and extends circumferentially around center axis CA. Inside surface 24 of sleeve 14 faces radially inward toward center axis CA. Inside surface 24 of sleeve 14 can be a polished and hardened surface that engages with spool 16 of transfer valve 10. In other examples, sleeve 14 can be omitted from transfer valve 10 and inner surface 22 of housing 12 can be a polished and hardened surface that engages directly with spool 16.

In the example of FIG. 1, spool 16 is inside of housing 12 and inside of sleeve 14. Spool 16 moves within housing 12 and sleeve 14 between first end 18 and second end 20 of housing 12 along center axis CA. First land 28 forms a first end of spool 16, second land 30 forms a second end of spool 16, and shaft 26 extends axially between first land 28 and second land 30. First land 28 and second land 30 are both connected to shaft 26. Third land 32 can be connected to shaft 26 and can be positioned axially between first land 28 and second land 30. Fourth land 34 can be connected to shaft 26 and is positioned axially between first land 28 and third land 32. Fifth land 36 can be connected to shaft 26 and is positioned axially between third land 32 and second land 30. In the example of FIG. 1, first land 28, second land 30, third land 32, fourth land 34, and fifth land 36 all have the same diameter relative to center axis CA and are all larger in diameter than shaft 26. In other examples, spool 16 only includes first land 28, second land 30, and third land 32, and omits fourth land 34 and fifth land 36. Seals 42 can be positioned on first land 28, second land 30, and third land 32 and can extend about center axis CA between sleeve 14 and first land 28, second land 30, and third land 32 respectively.

In the example of FIG. 1, first control surface 38 can be formed on first land 28 and faces axially toward first end 18 of housing 12. First cavity 44 can be formed by housing 12 and first control surface 38 and is axially between first control surface 38 and first end 18 of housing 12. Second control surface 40 can be formed on second land 30 and faces axially toward second end 20 of housing 12. Second cavity 46 can be formed by housing 12 and second control surface 40 and is axially between second control surface 40 and second end 20 of housing 12.

First window 48 can be formed by housing 12 and spool 16. First window 48 extends axially within housing 12 between first land 28 and fourth land 34 and extends circumferentially about shaft 26. Second window 50 can also be formed by housing 12 and spool 16. Second window 50 extends axially within housing 12 between fourth land 34 and third land 32 and extends circumferentially about shaft 26. Third window 52 can also be formed by housing 12 and spool 16. Third window 52 extends axially within housing 12 between third land 32 and fifth land 36 and extends circumferentially about shaft 26. Fourth window 54 can also be formed by housing 12 and spool 16. Fourth window 54 extends axially within housing 12 between fifth land 36 and second land 30 and extends circumferentially about shaft 26.

First control port 56 extends through housing 12 and through sleeve 14 to fluidically connect to first cavity 44. First control port 56 supplies fluid to first cavity 44 and can also drain fluid from first cavity 44 depending on an operational mode of transfer valve 10. Second control port 58 extends through housing 12 and through sleeve 14 to fluidically connect to second cavity 46. Second control port 58 supplies fluid to second cavity 46 and can also drain fluid from second cavity 46 depending on an operational mode of transfer valve 10. First centering port 60 extends through housing 12 and sleeve 14, and is axially between first control port 56 and second control port 58. First centering port 60 can be fluidically connected to a pressure return (not shown), such as a tank or drain. Second centering port 62 extends through housing 12 and sleeve 14, and is axially between first centering port 60 and second control port 58. Second centering port 62 is also connected to the pressure return.

As shown in the example of FIG. 1, first land 28 and second land 30 are axially spaced on spool 16 such that first land 28 blocks and closes first centering port 60 and second land 30 blocks and closes second centering port 62 when spool 16 is in a centered position within housing 12 of transfer valve 10. The centered position is defined as a position of spool 16 within housing 12 where spool 16 is pressure-balanced between first cavity 44 and second cavity 46. Spool 16 is pressure-balanced between first cavity 44 and second cavity 46 when fluid pressure in first cavity 44 is exerting a force on first control surface 38 that is equal to a force being exerted on second control surface 40 by fluid pressure in second cavity 46.

First system port 64 extends through housing 12 and sleeve 14 and fluidically connects with first window 48 when spool 16 is in the centered position. First actuator port 68 extends through housing 12 and sleeve 14 and also fluidically connects with first window 48 when spool 16 is in the centered position. First system port 64 can be connected to an actuator control valve (not shown) that is connected to a fluid source and a pressure return. When spool 16 is in the centered position, first actuator port 68 can be connected to an extend side of a first actuator (not shown) to supply fluid from the fluid source to the first actuator or to return fluid from the extend side of the first actuator to the actuator control valve.

Third actuator port 76 extends through housing 12 and sleeve 14 and fluidically connects with third window 52 when spool 16 is in the centered position. Third system port 72 extends through housing 12 and sleeve 14 and also fluidically connects with third window 52 when spool 16 is in the centered position. Third system port 72 can be connected to the actuator control valve. As noted above, the actuator control valve (not shown) can be connected to the fluid source and the pressure return. Third actuator port 76 can be connected to a retract side of the first actuator (not shown) to supply fluid to the retract side from the actuator control valve and to return fluid from the retract side to the actuator control valve when spool 16 is in the centered position. Together, first system port 64, first window 48, first actuator port 68, third actuator port 76, third window 52, and third system port 72 help form a first fluid circuit that supplies fluid to the first actuator and returns fluid from the first actuator through transfer valve 10 while spool 16 is in the centered position.

Second system port 66 extends through housing 12 and sleeve 14 and fluidically connects with second window 50 when spool 16 is in the centered position. Second actuator port 70 extends through housing 12 and sleeve 14 and also fluidically connects with second window 50 when spool 16 is in the centered position. Second system port 66 can be connected to an actuator control valve (not shown) that is connected to a fluid source and a pressure return. When spool 16 is in the centered position, second actuator port 70 can be connected to an extend side of a second actuator (not shown) to supply fluid from the actuator control valve to the extend side of the second actuator or to return fluid from the extend side of the second actuator to the actuator control valve.

Fourth actuator port 78 extends through housing 12 and sleeve 14 and fluidically connects with fourth window 54 when spool 16 is in the centered position. Fourth system port 74 extends through housing 12 and sleeve 14 and fluidically connects with fourth window 54 when spool 16 is in the centered position. Fourth system port 74 can be connected to the actuator control valve. As noted above, the actuator control valve (not shown) can be connected to the fluid source and the pressure return. Fourth actuator port 78 can be connected to a retract side of the second actuator (not shown) to supply fluid to the retract side of the second actuator from the actuator control valve and to return fluid from the retract side of the second actuator to the actuator control valve when spool 16 is in the centered position. Together, second system port 66, second window 50, second actuator port 70, fourth actuator port 78, fourth window 54, and fourth system port 74 help form a second fluid circuit that supplies fluid to the second actuator and returns fluid from the second actuator through transfer valve 10 while spool 16 is in the centered position. While the example transfer valve 10 in FIG. 1 can support fluid flow to two actuators, in some examples, transfer valve 10 can omit the second fluid circuit such that transfer valve 10 only supports a single actuator. In other examples of transfer valve 10, transfer valve 10 can include additional fluid circuits to support supply flow and return flow to more than two actuators.

The centered position of spool 16 can be used by transfer valve 10 when transfer valve 10 is in a standby operational mode. When in the standby operational mode, transfer valve 10 allows fluid to flow through transfer valve 10 to and from the first actuator and the second actuator while an actuator control valve (not shown) controls the flow to and from the first actuator and the second actuator. During the standby operational mode, spool 16 needs to remain in the centered position to prevent transfer valve 10 from interrupting the flow through transfer valve 10.

First centering port 60 and second centering port 62 passively aid in keeping spool 16 pressured balanced and in the centered position while transfer valve is in the standby operational mode. Should the pressure in first cavity 44 start to increase above the pressure in second cavity 46, spool 16 will shift toward second end 20 of housing 12 thereby opening first centering port 60 to first cavity 44 while second centering port 62 remains closed to second cavity 46. With first centering port 60 open and fluidically connected to first cavity 44, the excess pressure in first cavity 44 will bleed out of first cavity 44 and into first centering port 60. First centering port 60, being connected to a lower pressure than the pressure in first cavity 44, directs the excess pressure to the pressure return. As the excess pressure in first cavity 44 bleeds out of first cavity 44 through first centering port 60, the pressure inside first cavity 44 decreases and spool 16 moves toward first end 18 of housing 12. Spool 16 continues to move toward first end 18 of housing 12 until the pressure inside first cavity 44 matches the pressure inside second cavity 46, at which point spool 16 returns to the centered position where spool 16 blocks and closes first centering port 60 from first cavity 44. When transfer valve 10 is used in aircraft, external forces (such as from gravity and/or maneuvering) can act on spool 16 to urge spool 16 out of the centered position. When external forces act on spool 16 to move spool 16 out of the centered position, first centering port 60 and second centering port 62 can function as described above to maintain spool 16 in the centered position.

Should the pressure in second cavity 46 start to increase above the pressure in first cavity 44, spool 16 will shift toward first end 18 of housing 12 thereby opening second centering port 62 to second cavity 46 while first centering port 60 remains closed to first cavity 44. With second centering port 62 open and fluidically connected to second cavity 46, the excess pressure in second cavity 46 will bleed out of second cavity 46 and into second centering port 62. Second centering port 62, being connected to a lower pressure than the pressure in second cavity 46, directs the excess pressure to the pressure return. As the excess pressure in second cavity 46 bleeds out of second cavity 46 through second centering port 62, the pressure inside second cavity 46 decreases and spool 16 moves toward second end 20 of housing 12. Spool 16 continues to move toward second end 20 of housing 12 until the pressure inside second cavity 46 matches the pressure inside first cavity 44, at which point spool 16 returns to the centered position where spool 16 blocks and closes second centering port 62 from second cavity 46. In this manner transfer valve 10 can self-center and maintain the centered position without the need for springs or electro-mechanical interconnect devices (EMIDs). Without springs or EMIDs, transfer valve 10 can be lighter and more economical than traditional transfer valves.

Figure 2A:
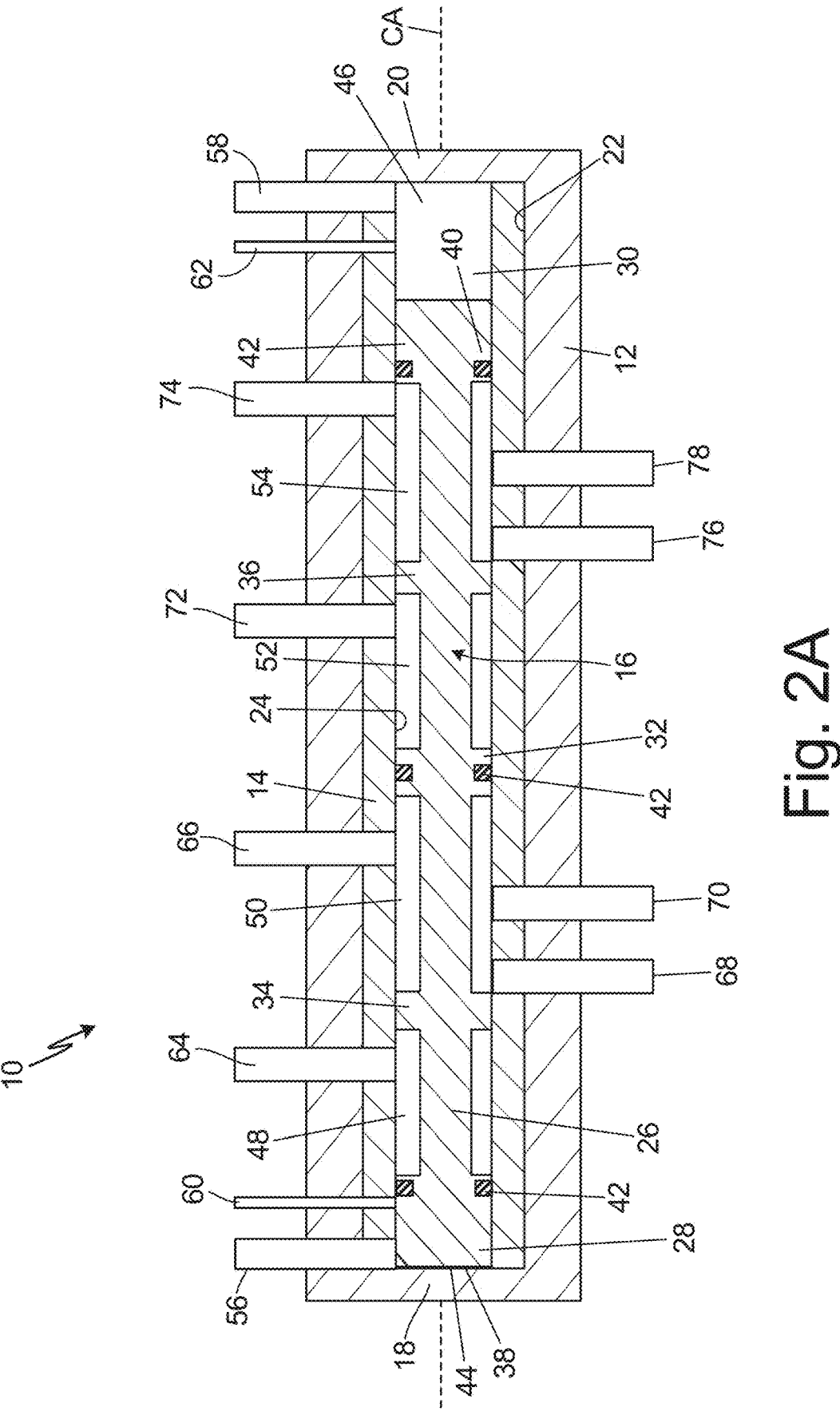
FIG. 2A is another cross-sectional view of the transfer valve from FIG. 1 operating in a backup operational mode with the spool out of the centered position.
Figure 2B:
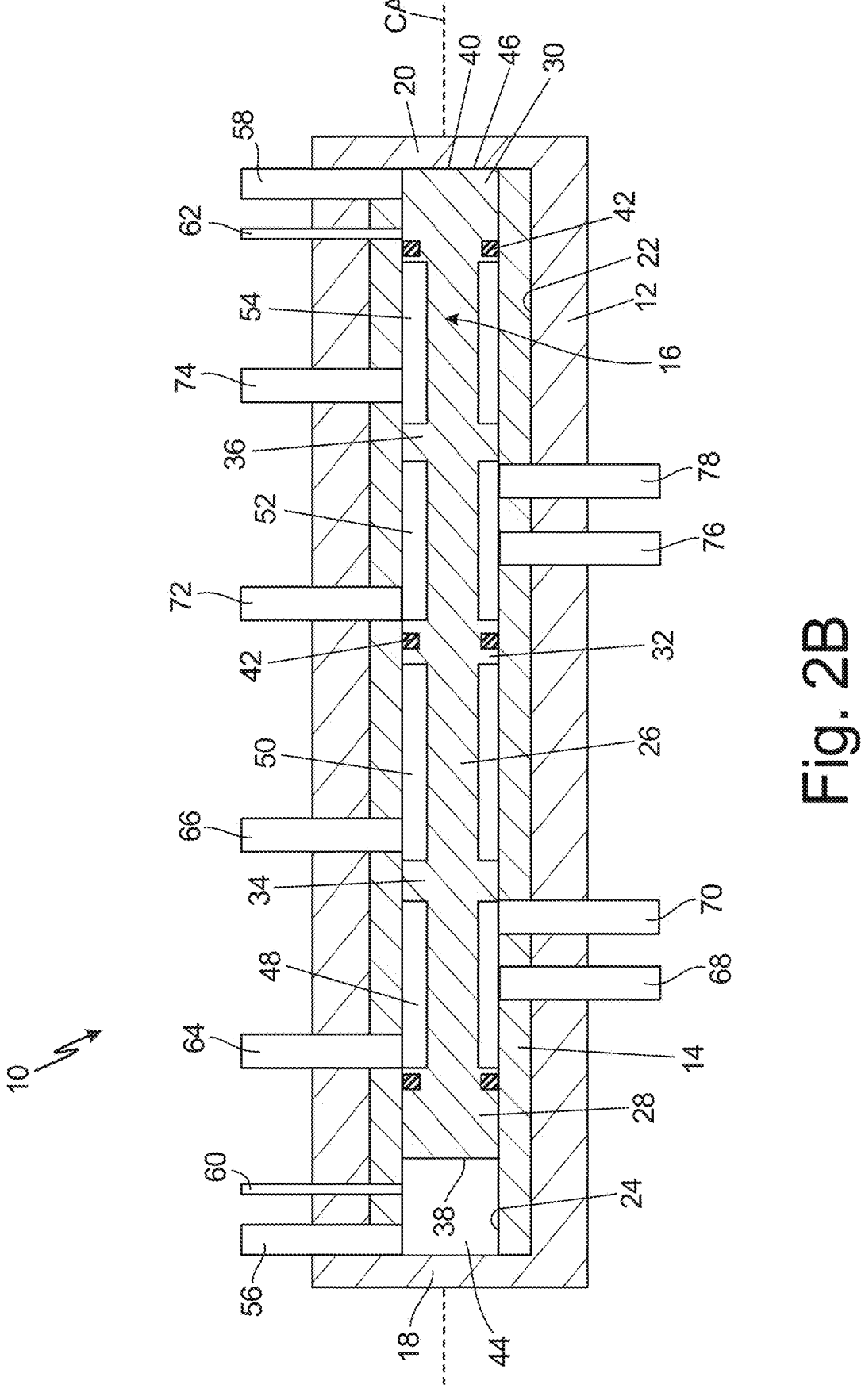
FIG. 2B is another cross-sectional view of the transfer valve from FIGS. 1 and 2A operating in the backup operational mode with the spool out of the centered position.

FIGS. 2A and 2B show additional cross-sectional views of the example of transfer valve 10 from FIG. 1. In the example of FIGS. 2A and 2B, transfer valve 10 is in a backup operational mode where transfer valve 10 can actively adjust supply flow and return flow from the first actuator (not shown) and the second actuator (not shown). In the example of FIG. 2A, first control port 56 has been deliberately connected to a low-pressure source (such as the pressure return) while second control port 58 is connected to a higher-pressure source than the first control port 56. With the first control port 56 connected to the low-pressure source and second control port 58 connected to the higher-pressure source, the pressure in second cavity 46 pushes spool 16 toward first end 18 of housing 12. As spool 16 moves toward first end 18, spool 16 causes first cavity 44 to drain through first control port 56 and to shrink between first end 18 and first control surface 38. As spool 16 moves toward first end 18, fourth land 34 can block first system port 64 from first actuator port 68 while second window 50 fluidically connects second system port 66 to first actuator port 68 to take over control of the first actuator (not shown) and still maintain control of the second actuator (not shown). As spool 16 moves toward first end 18, fifth land 36 can block third system port 72 from third actuator port 76 while fourth window 54 fluidically connects fourth system port 74 to third actuator port 76 to take over control of the first actuator and still maintain control of the second actuator in the event first system port 64 and/or third system port 72 are unable to service the first actuator.

As spool 16 moves toward first end 18 during the backup operational mode of transfer valve 10, second land 30 of spool 16 will move away from second centering port 62, causing second centering port 62 to be open to second cavity 46. Second centering port 62 has a smaller cross-sectional flow area than second control port 58, or includes an orifice with a smaller cross-sectional flow area than second control port 58, such that bleed flow through second centering port 62 is too small to prevent the pressure in second cavity 46 from effecting movement of spool 16 toward first end 18 of housing 12.

In the example of FIG. 2B, second control port 58 has been deliberately connected to a low-pressure source (such as the pressure return) while first control port 56 is connected to a higher-pressure source than the second control port 58. With the second control port 58 connected to the low-pressure source and first control port 56 connected to the higher-pressure source, the pressure in first cavity 44 pushes spool 16 toward second end 20 of housing 12. As spool 16 moves toward second end 20, fourth land 34 can block second system port 66 from second actuator port 70 while first window 48 fluidically connects first system port 64 to second actuator port 70 to take over control of the second actuator (not shown) and still maintain control of the first actuator (not shown). As spool 16 moves toward second end 20, fifth land 36 can block fourth system port 74 from fourth actuator port 78 while third window 52 fluidically connects third system port 72 to fourth actuator port 78 to take over control of the second actuator and still maintain control of the first actuator in the event second system port 66 and/or fourth system port 72 are unable to service the second actuator.

As spool 16 moves toward second end 20 during the backup operational mode of transfer valve 10, first land 28 of spool 16 will move away from first centering port 60, causing first centering port 60 to be open to first cavity 44. First centering port 60 has a smaller cross-sectional flow area than first control port 56, or includes an orifice with a smaller cross-sectional flow area than first control port 56, such that bleed flow through first centering port 60 is too small to prevent the pressure in first cavity 44 from effecting movement of spool 16 toward second end 20 of housing 12. The backup operational mode of transfer 10 can be used to control flow to and from the first actuator and the second actuator when an actuator control valve fails or malfunctions, or when additional control of flow to and from the first actuator and/or the second actuator is required. As disclosed below with reference to FIGS. 3A-4B, solenoid valves or an electrohydraulic servo valve can be used to switch transfer valve 10 between the standby operational mode and the backup operational mode.

Figure 3A:
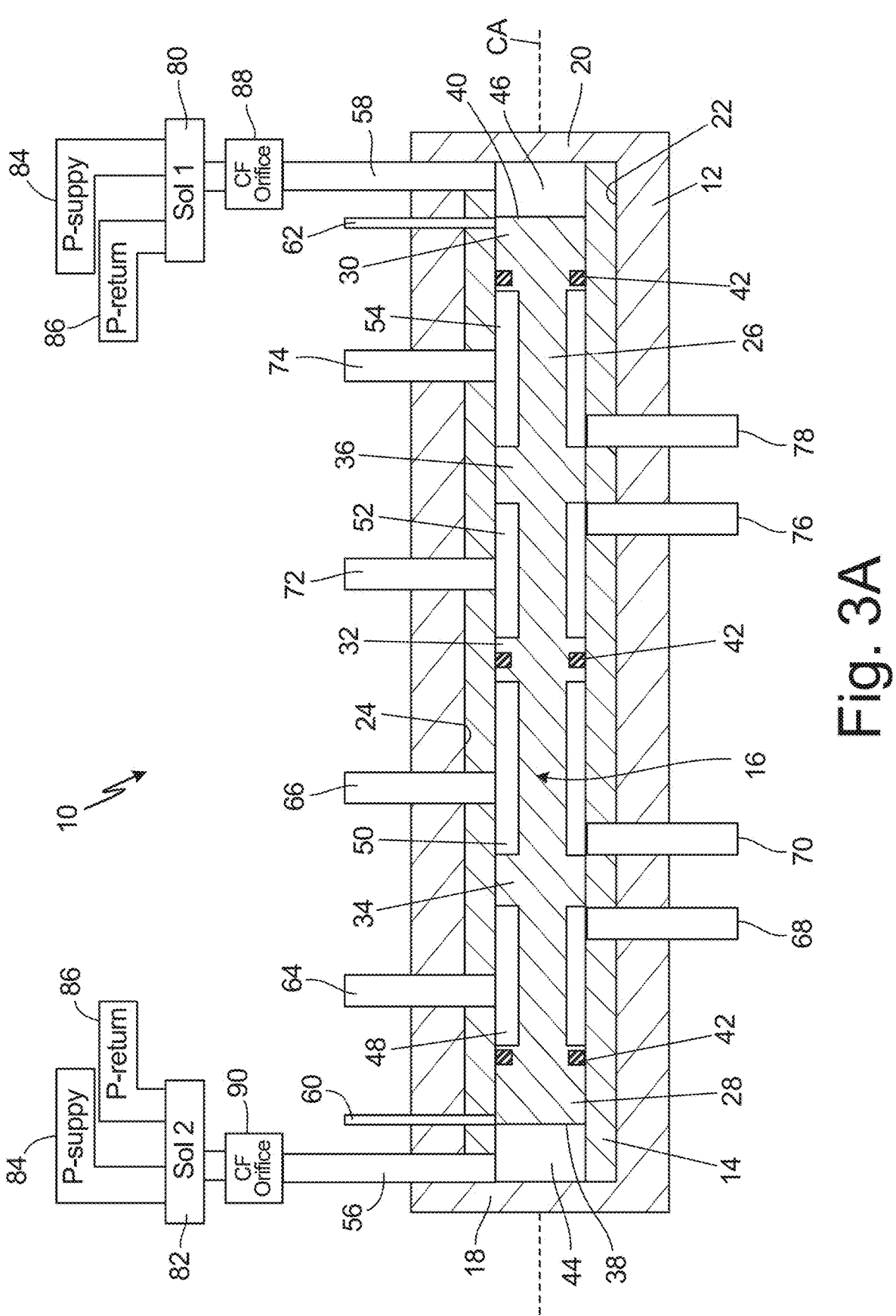
FIG. 3A is a schematic cross-sectional view of the transfer valve from FIG. 1 connected to a pressure supply and a pressure return by a first solenoid valve and a second solenoid valve.

FIG. 3A is a schematic cross-sectional view of the example of transfer valve 10 from FIG. 1 connected to pressure supply 84 and pressure return 86 by first solenoid valve 80 and second solenoid valve 82. Pressure supply 84 can be a pressurized fluid that is supplied by a pump and that is at a higher pressure than pressure return 86. Pressure return 86 can be a tank or reservoir that is at a lower pressure than pressure supply 84. As shown in FIG. 3A, first solenoid valve 80 is fluidically connected to second control port 58, pressure supply 84, and pressure return 86. Second solenoid valve 82 can be fluidically connected to first control port 56, pressure supply 84, and pressure return 86.

When transfer valve 10 is in the standby operational mode (as shown in FIGS. 1 and 3), first solenoid valve 80 fluidically connects second control port 58 to pressure supply 84 and second solenoid valve 82 fluidically connects first control port 56 to pressure supply 84. With both first control port 56 and second control port 58 connected to pressure supply 84, the pressure in first cavity 44 is equal to the pressure in second cavity 46 and spool 16 is in the centered position within housing 12. First centering port 60 and second centering port 62 can both be fluidically connected to pressure return 86 to bleed pressure out transfer valve 10 if spool 16 shifts out of the centered position while transfer valve 10 is in the standby operational mode. To shift transfer valve 10 from the standby operational mode to the backup operational mode, a command can be sent to one of first solenoid valve 80 or second solenoid valve 82 to connect first control port 56 or second control port 58 to pressure return 86, thereby creating a pressure differential between first cavity 44 and second cavity 46 that causes spool 16 to move within housing 12 of transfer valve 10. First orifice 88 can be provided fluidically between first solenoid 80 and second control port 58 to control the speed of flow in and out of second cavity 46 and to control the speed at which spool 16 responds and moves within housing 12. Second orifice 90 can be provided fluidically between second solenoid 82 and first control port 56 to control the speed of flow in and out of first cavity 44 and to also control the speed at which spool 16 responds and moves within housing 12.

Figure 3B:
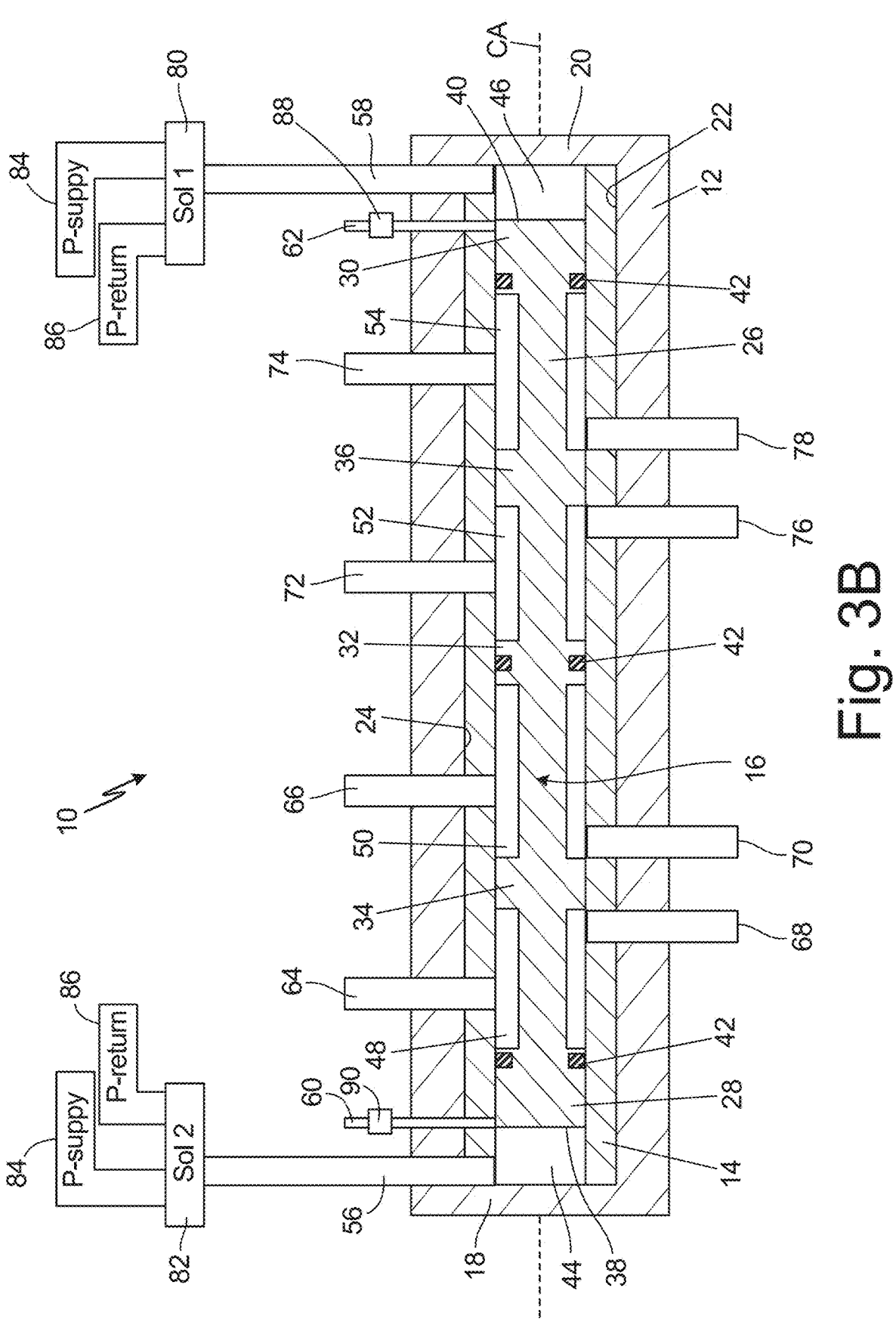
FIG. 3B is another schematic cross-sectional view of the transfer valve from FIG. 1 connected to a pressure supply and a pressure return by a first solenoid valve and a second solenoid valve.

FIG. 3B is another schematic cross-sectional view of transfer valve 10 from FIG. 1 connected to pressure supply 84 and pressure return 86 by first solenoid valve 80 and second solenoid valve 82. The example of FIG. 3B is similar to the example of FIG. 3A except first orifice 88 can be provided fluidically between second centering port 62 and pressure return 86, and second orifice 90 can be provided fluidically between first centering port 60 and pressure return 86. In the example of FIG. 3B, no orifices are present between first solenoid valve 80 and second control port 58. Also, no orifices are present between second solenoid valve 82 and first control port 56. Since orifices 88 and 90 are downstream of transfer valve 10, first solenoid valve 80, and second solenoid valve 82, the orifices 88 and 90 in the example of FIG. 3B do not slow down the transfer time of transfer valve 10 during the backup operational mode. Orifices 88 and 90 also manage the rate of leakage from first cavity 44 and second cavity 46 such that the rate of leakage is not so great as to impact control of transfer valve 10 during the backup operational mode, but still sufficient to provide centering of spool 16 during the standby operational mode.

Figure 4A:
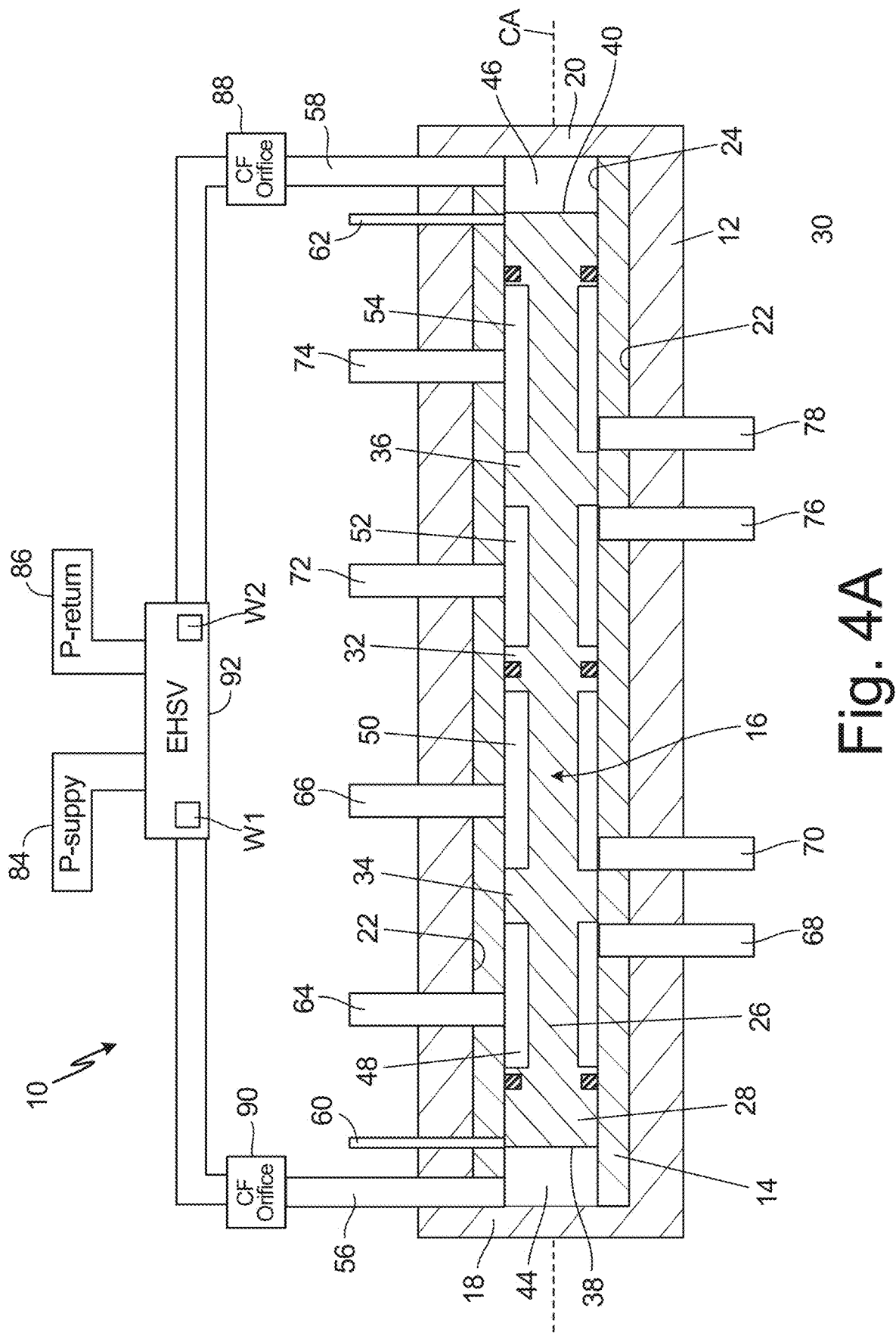
FIG. 4A is a schematic cross-sectional view of the transfer valve from FIG. 1 connected to a pressure supply and a pressure return by an electrohydraulic servo valve.

FIG. 4A is a schematic cross-sectional view of transfer valve 10 from FIG. 1 connected to pressure supply 84 and pressure return 86 by electrohydraulic servo valve (EHSV) 92. As shown in the example of FIG. 4A, EHSV 92 can be fluidically connected to first control port 56, second control port 58, pressure supply 84, and pressure return 86. When transfer valve 10 is in the standby operational mode (as shown in FIGS. 1 and 4), EHSV 92 fluidically connects both first control port 56 and second control port 58 to pressure supply 84. With both first control port 56 and second control port 58 connected to pressure supply 84, the pressure in first cavity 44 is equal to the pressure in second cavity 46 and spool 16 is in the centered position within housing 12. First centering port 60 and second centering port 62 can both be fluidically connected to pressure return 86 to bleed pressure out transfer valve 10 if spool 16 shifts out of the centered position while transfer valve 10 is in the standby operational mode. To shift transfer valve 10 from the standby operational mode to the backup operational mode, a command can be sent to EHSV 92 to connect first control port 56 or second control port 58 to pressure return 86, thereby creating a pressure differential between first cavity 44 and second cavity 46 that causes spool 16 to move within housing 12 of transfer valve 10. First orifice 88 can be provided fluidically between EHSV 92 and second control port 58 to control the speed of flow in and out of second cavity 46 and to control the speed at which spool 16 responds and moves within housing 12. Second orifice 90 can be provided fluidically between EHSV 92 and first control port 56 to control the speed of flow in and out of first cavity 44 and to also control the speed at which spool 16 responds and moves within housing 12. In other examples, under-lapped windows or separate orifices in EHSV 92 can be used to fluidically connect first control port 56 to pressure supply 84 and/or to pressure return 86, and to fluidically connect second control port 58 to pressure supply 84 and/or to pressure return 86 in response to a null current command to EHSV 92. First window W1 of EHSV 92 can fluidically connect first control port 56 to pressure supply 84 and/or to pressure return 86. In place of second orifice 90, first window W1 can be under-lapped or include an orifice to produce the same benefit of second orifice 90. Second window W2 of EHSV 92 can fluidically connect second control port 58 to pressure supply 84 and/or to pressure return 86. In place of first orifice 88, second window W2 can be under-lapped or include an orifice to produce the same benefit of first orifice 88.

Figure 4B:
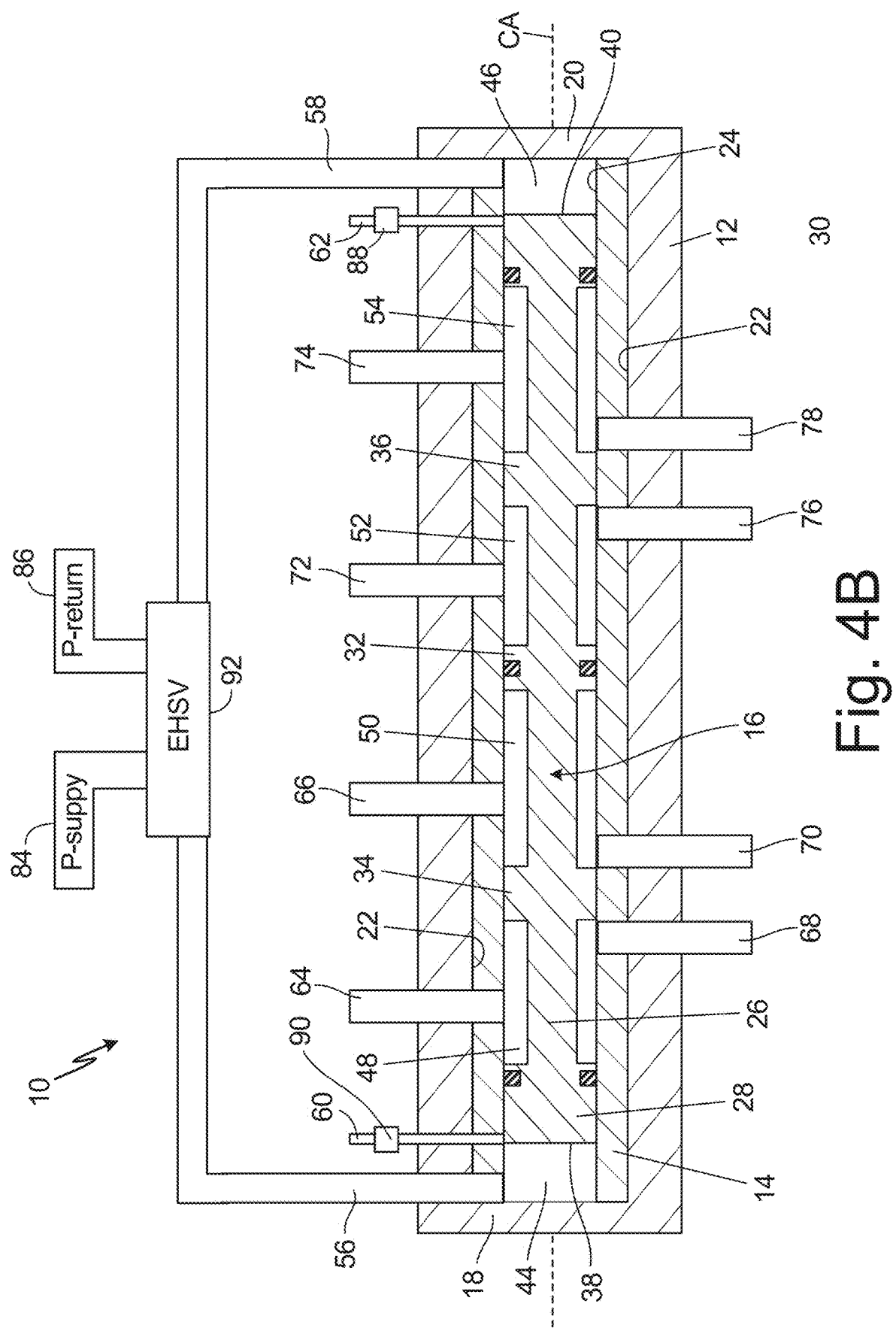
FIG. 4B is another schematic cross-sectional view of the transfer valve from FIG. 1 connected to a pressure supply and a pressure return by an electrohydraulic servo valve.

FIG. 4B is another schematic cross-sectional view of transfer valve 10 from FIG. 1 connected to pressure supply 84 and pressure return 86 by EHSV 92. The example of FIG. 4B is similar to the example of FIG. 4A except first orifice 88 can be provided fluidically between second centering port 62 and pressure return 86, and second orifice 90 can be provided fluidically between first centering port 60 and pressure return 86. In the example of FIG. 4B, no orifices are present between EHSV 92 and second control port 58. Also, no orifices are present between EHSV 92 and first control port 56. Since orifices 88 and 90 are downstream of transfer valve 10 and EHSV 92, the orifices 88 and 90 in the example of FIG. 4B do not slow down the transfer time of transfer valve 10 during the backup operational mode. Orifices 88 and 90 also manage the rate of leakage from first cavity 44 and second cavity 46 such that the rate of leakage is not so great as to impact control of transfer valve 10 during the backup operational mode, but still sufficient to provide centering of spool 16 during the standby operational mode.

Figure 5:
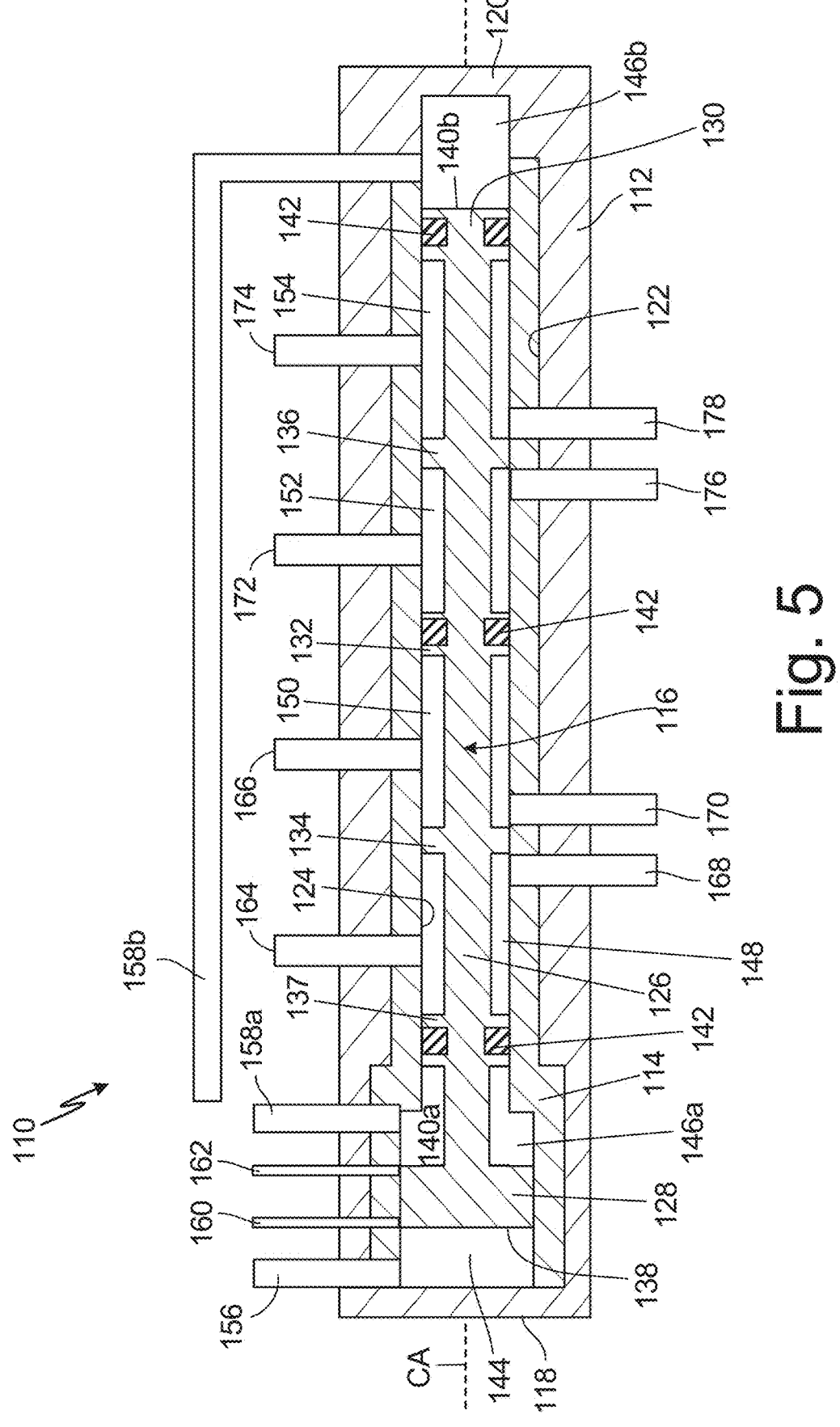
FIG. 5 is a cross-sectional view of another example of a transfer valve with a first centering port, a second centering port, and a spool in a centered position.

FIG. 5 discloses another example of a transfer valve (transfer valve 110) that is related to the example of transfer valve 10 from FIG. 1. The example of transfer valve 110 shown in FIG. 5 is in a standby operational mode that allows fluid to flow through transfer valve 110. The example of transfer valve 110 in FIG. 5 includes housing 112, sleeve 114, and spool 116. Housing 112 includes first end 118, second end 120, and inner surface 122. Sleeve 114 includes inside surface 124. Spool 116 includes shaft 126, first land 128, second land 130, third land 132, fourth land 134, fifth land 136 and sixth land 137. Spool 116 further includes first control surface 138, second control surface 140a, third control surface 140b, and seals 142. In the example of FIG. 5, transfer valve 110 further includes first cavity 144, second cavity 146a, third cavity 146b, first window 148, second window 150, third window 152, and fourth window 154. The example of transfer valve 110 in FIG. 5 also includes first control port 156, second control port 158a, third control port 158b, first centering port 160, second centering port 162, first system port 164, second system port 166, first actuator port 168, second actuator port 170, third system port 172, fourth system port 174, third actuator port 176, and fourth actuator port 178.

As shown in the example of FIG. 5, housing 112 extends axially along center axis CA from first end 118 to second end 120. Housing 112 can be hollow and generally tubular with inner surface 122 extending circumferentially about center axis CA. First end 118 and second end 120 can both be closed, as shown in FIG. 5. Sleeve 114 is inside housing 112 and is radially inward from inner surface 122 relative to center axis CA. Sleeve 114 extends axially between first end 118 and second end 120 of housing 112, and extends circumferentially around center axis CA. Inside surface 124 of sleeve 114 faces radially inward toward center axis CA. Inside surface 124 of sleeve 114 can be a polished and hardened surface that engages with spool 116 of transfer valve 110. In other examples, sleeve 114 can be omitted from transfer valve 110 and inner surface 122 of housing 112 can be a polished and hardened surface that engages directly with spool 116.

In the example of FIG. 5, spool 116 is inside of housing 112 and inside of sleeve 114. Spool 116 moves within housing 112 and sleeve 114 between first end 118 and second end 120 of housing 112 along center axis CA. First land 128 forms a first end of spool 116, second land 130 forms a second end of spool 116, and shaft 126 extends axially between first land 128 and second land 130. First land 128 and second land 130 are both connected to shaft 126. Third land 132 can be connected to shaft 126 and is positioned axially between first land 128 and second land 130. Fourth land 134 can be connected to shaft 126 and is positioned axially between first land 128 and third land 132. Fifth land 136 can be connected to shaft 126 and is positioned axially between third land 132 and second land 130. Sixth land 137 can be connected to shaft 126 and is positioned axially between first land 128 and fourth land 134. In the example of FIG. 5, second land 130, third land 132, fourth land 134, fifth land 136, and sixth land 137 all have the same diameter relative to center axis CA and are all larger in diameter than shaft 126. First land 128 can have a diameter relative to center axis CA that is larger than the diameter of second land 130, third land 132, fourth land 134, fifth land 136, and sixth land 137. In other examples, spool 116 only includes first land 128, second land 130, third land 132, and sixth land 137, and omits fourth land 134 and fifth land 136. Seals 142 can be positioned on sixth land 137, second land 130, and third land 132 and can extend about center axis CA between sleeve 114 and sixth land 137, second land 130, and third land 132 respectively.

In the example of FIG. 5, first control surface 138 can be formed on first land 128 and forms a first side of first land 128 that faces axially toward first end 118 of housing 112. First cavity 144 can be formed by housing 112 and first control surface 138 and is axially between first control surface 138 and first end 118 of housing 112. Second control surface 140a can be formed on first land 128 and forms a second side of first land 128 that faces axially toward second end 120 of housing 112. Second cavity 146a can be formed by housing 112, second control surface 140a, and sixth land 137, and is axially between second control surface 140a and sixth land 137. Third control surface 140b can be formed on second land 130 and faces axially toward second end 120 of housing 112. Third cavity 146b can be formed by housing 112 and third control surface 140b and is axially between third control surface 140b and second end 120 of housing 112.

First window 148 can be formed by housing 12 and spool 16. First window 148 extends axially within housing 112 between sixth land 137 and fourth land 134 and extends circumferentially about shaft 126. Second window 150 can also be formed by housing 112 and spool 116. Second window 150 extends axially within housing 112 between fourth land 134 and third land 132 and extends circumferentially about shaft 126. Third window 152 can also be formed by housing 112 and spool 116. Third window 152 extends axially within housing 112 between third land 132 and fifth land 136 and extends circumferentially about shaft 126. Fourth window 154 can also be formed by housing 112 and spool 116. Fourth window 154 extends axially within housing 112 between fifth land 136 and second land 130 and extends circumferentially about shaft 126.

First control port 156 extends through housing 112 and through sleeve 114 to fluidically connect to first cavity 144. First control port 156 supplies fluid to first cavity 144 and can also drain fluid from first cavity 144 depending on an operational mode of transfer valve 110. Second control port 158a extends through housing 112 and through sleeve 114 to fluidically connect to second cavity 146a. Second control port 158a supplies fluid to second cavity 146a and can also drain fluid from second cavity 146a depending on an operational mode of transfer valve 110. Third control port 158b extends through housing 112 and through sleeve 114 to fluidically connect to third cavity 146b. Third control port 158b supplies fluid to third cavity 146b and can also drain fluid from third cavity 146b depending on an operational mode of transfer valve 110. Third control port 158b can be fluidically connected directly to second control port 158a such that third control port 158b and second control port 158c share the same pressure, and second cavity 146a and third cavity 146b share the same pressure. First centering port 160 extends through housing 112 and sleeve 114, and is axially between first control port 156 and second control port 158a. First centering port 160 can be fluidically connected to a pressure return (not shown), such as a tank or drain. Second centering port 162 extends through housing 112 and sleeve 114, and is axially between first centering port 160 and second control port 158a. Second centering port 162 is also connected to the pressure return.

As shown in the example of FIG. 5, first land 128 can be sufficiently wide in the direction of center axis CA to block and close both first centering port 160 and second centering port 162 when spool 116 is in a centered position within housing 112 of transfer valve 110. The centered position is defined as a position of spool 116 within housing 112 where spool 116 is pressure-balanced between first cavity 144 and third cavity 146b. Spool 116 is pressure-balanced between first cavity 144 and third cavity 146b when fluid pressure in first cavity 144 is exerting a force on first control surface 138 that is equal to the sum of both the force being exerted on second control surface 140a by fluid pressure in second cavity 146a and the force being exerted on third control surface 140b by fluid pressure in third cavity 146b. Second cavity 146a and third cavity 146b can each have an equal surface area when spool 116 is pressure balanced to the centered position within housing 112.

First system port 164 extends through housing 112 and sleeve 114 and fluidically connects with first window 148 when spool 116 is in the centered position. First actuator port 168 extends through housing 112 and sleeve 114 and also fluidically connects with first window 148 when spool 116 is in the centered position. First system port 164 can be connected to an actuator control valve (not shown) that is connected to a fluid source and a pressure return. When spool 116 is in the centered position, first actuator port 168 can be connected to an extend side of a first actuator (not shown) to supply fluid from the fluid source to the first actuator or to return fluid from the extend side of the first actuator to the actuator control valve.

Third actuator port 176 extends through housing 112 and sleeve 114 and fluidically connects with third window 152 when spool 116 is in the centered position. Third system port 172 extends through housing 112 and sleeve 114 and also fluidically connects with third window 152 when spool 116 is in the centered position. Third system port 172 can be connected to the actuator control valve. As noted above, the actuator control valve (not shown) can be connected to the fluid source and the pressure return. Third actuator port 176 can be connected to a retract side of the first actuator (not shown) to supply fluid to the retract side from the actuator control valve and to return fluid from the retract side to the actuator control valve when spool 116 is in the centered position. Together, first system port 164, first window 148, first actuator port 168, third actuator port 176, third window 152, and third system port 172 help form a first fluid circuit that supplies fluid to the first actuator and returns fluid from the first actuator through transfer valve 110 while spool 116 is in the centered position.

Second system port 166 extends through housing 112 and sleeve 114 and fluidically connects with second window 150 when spool 116 is in the centered position. Second actuator port 170 extends through housing 112 and sleeve 114 and also fluidically connects with second window 150 when spool 116 is in the centered position. Second system port 166 can be connected to an actuator control valve (not shown) that is connected to a fluid source and a pressure return. When spool 116 is in the centered position, second actuator port 170 can be connected to an extend side of a second actuator (not shown) to supply fluid from the actuator control valve to the extend side of the second actuator or to return fluid from the extend side of the second actuator to the actuator control valve.

Fourth actuator port 178 extends through housing 112 and sleeve 114 and fluidically connects with fourth window 154 when spool 116 is in the centered position. Fourth system port 174 extends through housing 112 and sleeve 114 and fluidically connects with fourth window 154 when spool 116 is in the centered position. Fourth system port 174 can be connected to the actuator control valve. As noted above, the actuator control valve (not shown) can be connected to the fluid source and the pressure return. Fourth actuator port 178 can be connected to a retract side of the second actuator (not shown) to supply fluid to the retract side of the second actuator from the actuator control valve and to return fluid from the retract side of the second actuator to the actuator control valve when spool 116 is in the centered position. Together, second system port 166, second window 150, second actuator port 170, fourth actuator port 178, fourth window 154, and fourth system port 174 help form a second fluid circuit that supplies fluid to the second actuator and returns fluid from the second actuator through transfer valve 110 while spool 116 is in the centered position. While the example transfer valve 110 in FIG. 5 can support fluid flow to two actuators, in some examples, transfer valve 110 can omit the second fluid circuit such that transfer valve 110 only supports a single actuator. In other examples of transfer valve 110, transfer valve 110 can include additional fluid circuits to support supply flow and return flow to more than two actuators.

The centered position of spool 116 is used by transfer valve 110 when transfer valve 110 is in a standby operational mode. When in the standby operational mode, transfer valve 110 allows fluid to flow through transfer valve 110 to and from the first actuator and the second actuator while an actuator control valve (not shown) controls the flow to and from the first actuator and the second actuator. During the standby operational mode, spool 116 needs to remain in the centered position to prevent transfer valve 110 from interrupting the flow through transfer valve 110.

First centering port 160 and second centering port 162 passively aid in keeping spool 116 pressured balanced and in the centered position while transfer valve 110 is in the standby operational mode. Should the pressure in first cavity 144 start to increase above the pressure in second cavity 146a and third cavity 146b, spool 116 will shift toward second end 120 of housing 112 thereby opening first centering port 160 to first cavity 144 while second centering port 162 remains closed to second cavity 146a. With first centering port 160 open and fluidically connected to first cavity 144, the excess pressure in first cavity 144 will bleed out of first cavity 144 and into first centering port 160. First centering port 160, being connected to a lower pressure than the pressure in first cavity 144, directs the excess pressure to the pressure return. As the excess pressure in first cavity 144 bleeds out of first cavity 144 through first centering port 160, the pressure inside first cavity 144 decreases and spool 116 moves toward first end 118 of housing 112. Spool 116 continues to move toward first end 118 of housing 112 until the pressure inside first cavity 44 matches the pressure inside second cavity 146a and third cavity 146b, at which point spool 116 returns to the centered position where spool 116 blocks and closes first centering port 160 from first cavity 144.

Should the pressure in second cavity 146a and third cavity 146b start to increase above the pressure in first cavity 144, spool 116 will shift toward first end 118 of housing 112 thereby opening second centering port 162 to second cavity 146a while first centering port 160 remains closed to first cavity 144. With second centering port 162 open and fluidically connected to second cavity 146a, the excess pressure in second cavity 146a (and in third cavity 146b) will bleed out of second cavity 146a and into second centering port 162. Second centering port 162, being connected to a lower pressure than the pressure in second cavity 146a and third cavity 146b, directs the excess pressure to the pressure return. As the excess pressure in second cavity 146a and third cavity 146b bleeds out through second centering port 162, the pressure inside second cavity 146a and third cavity

146b decreases and spool 116 moves toward second end 120 of housing 112. Spool 116 continues to move toward second end 120 of housing 112 until the pressure inside second cavity 146a and third cavity 146b matches the pressure inside first cavity 144, at which point spool 116 returns to the centered position where spool 116 blocks and closes second centering port 162 from second cavity 146a. In this manner transfer valve 110 can self-center and maintain the centered position without the need for springs or electro-mechanical interconnect devices (EMIDs). Without springs or EMIDs, transfer valve 110 is lighter and more economical than traditional transfer valves.

Figure 6A:
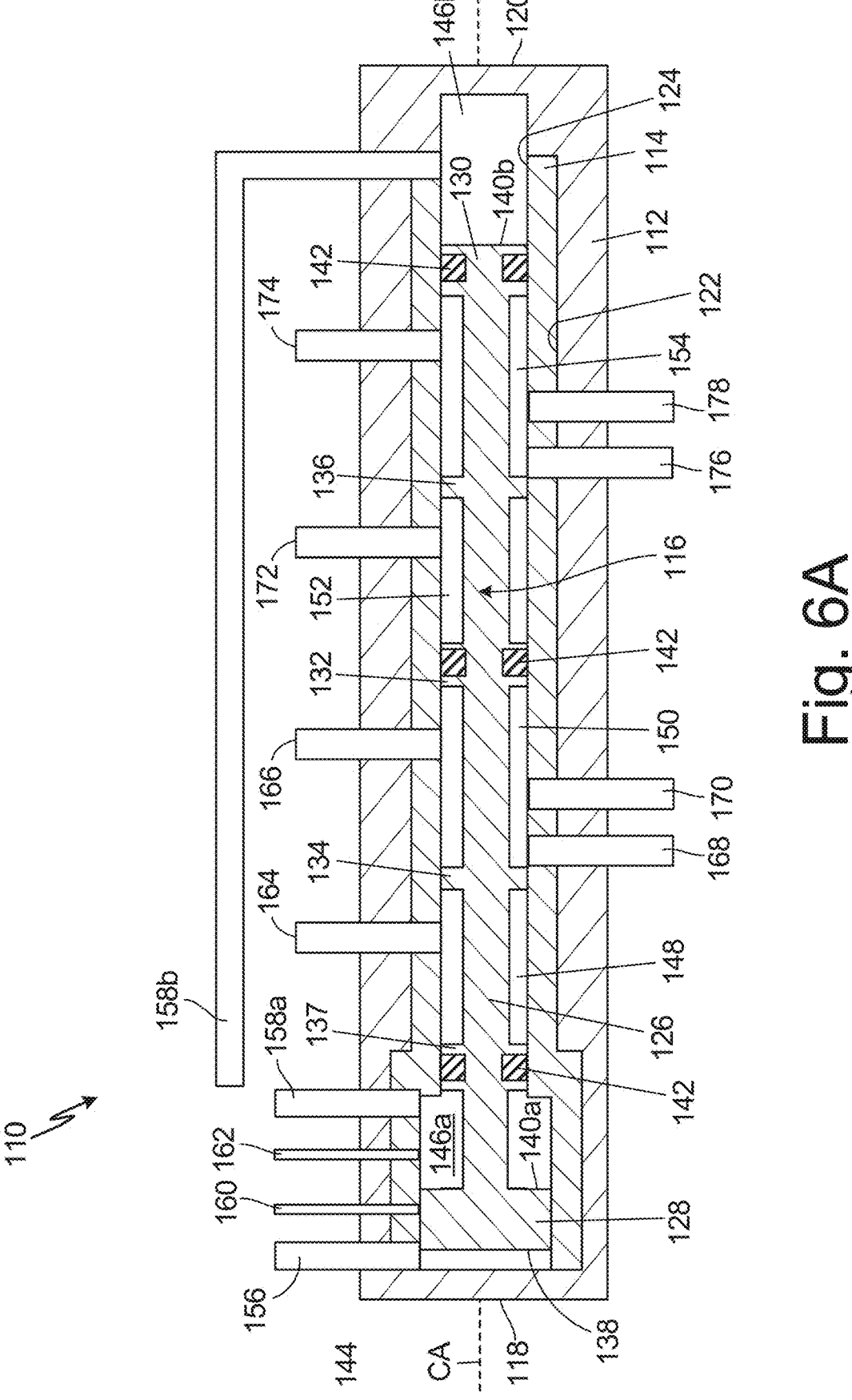
FIG. 6A is another cross-sectional view of the transfer valve from FIG. 5 operating in a backup operational mode with the spool out of the centered position.
Figure 6B:
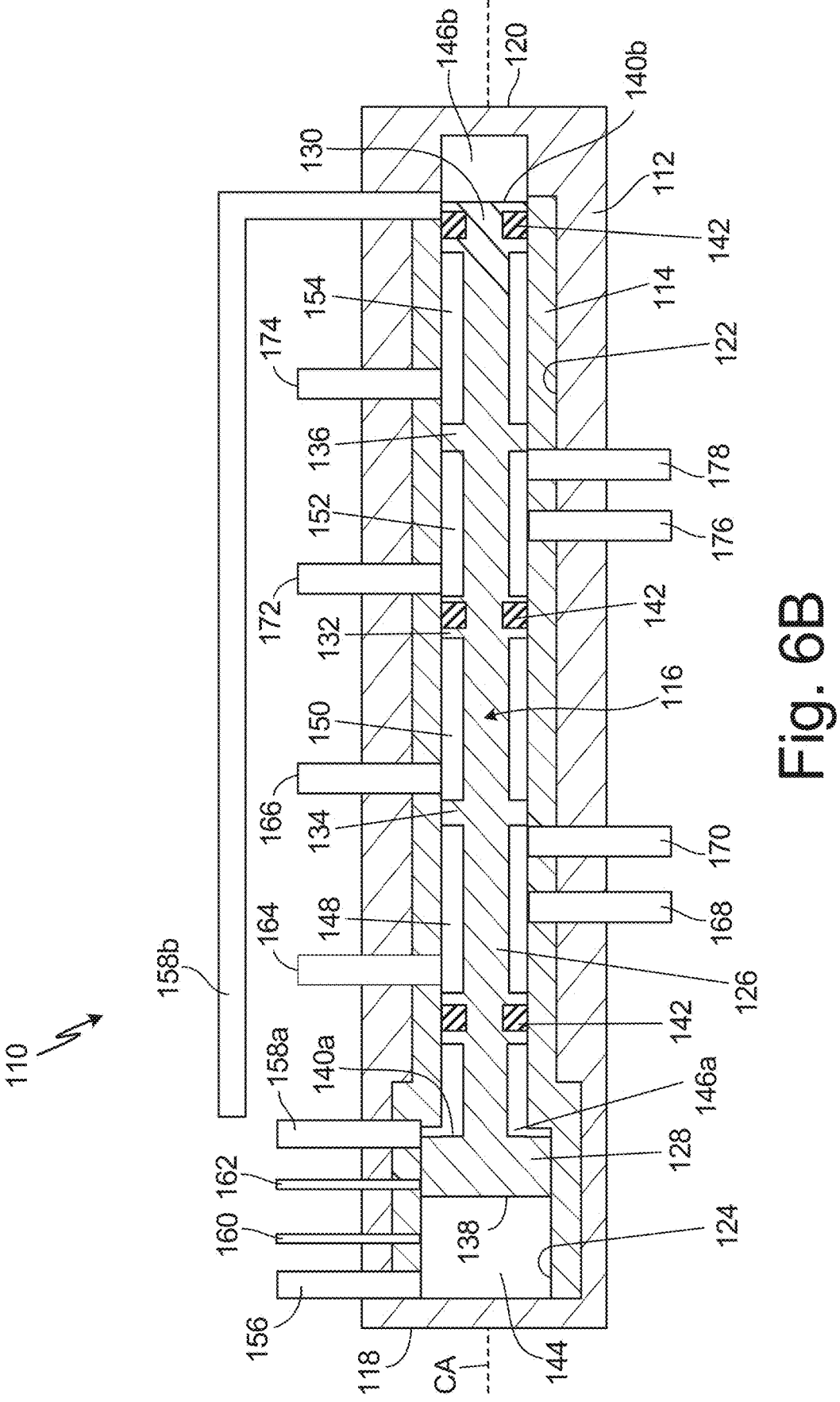
FIG. 6B is another cross-sectional view of the transfer valve from FIG. 5 operating in the backup operational mode with the spool out of the centered position.

FIGS. 6A and 6B show additional cross-sectional views of the example of transfer valve 110 from FIG. 5. In the example of FIGS. 6A and 6B, transfer valve 110 is in a backup operational mode where transfer valve 110 can actively adjust supply flow and return flow from the first actuator (not shown) and the second actuator (not shown). In the example of FIG. 6A, first control port 156 has been deliberately connected to a low-pressure source (such as the pressure return) while second control port 158a and third control port 158b are connected to a higher-pressure source than the first control port 156. With the first control port 156 connected to the low-pressure source and both second control port 158a and third control port 158b connected to the higher-pressure source, the pressure in second cavity 146a and third cavity 146b pushes spool 116 toward first end 118 of housing 112. As spool 116 moves toward first end 118, spool 116 causes first cavity 144 to drain through first control port 156 and to shrink between first end 118 and first control surface 138. As spool 116 moves toward first end 118, fourth land 134 and fifth land 136 can modulate or block flow to and from the first actuator by partially closing or fully closing at least one of first system port 164 and first actuator port 168, and by partially closing or fully closing at least one of third system port 172 and third actuator port 176. As spool 116 moves toward first end 118, fourth land 134 can block first system port 164 from first actuator port 168 while second window 150 fluidically connects second system port 166 to first actuator port 168 to take over control of the first actuator (not shown) and still maintain control of the second actuator (not shown). As spool 116 moves toward first end 118, fifth land 136 can block third system port 172 from third actuator port 176 while fourth window 154 fluidically connects fourth system port 174 to third actuator port 176 to take over control of the first actuator and still maintain control of the second actuator in the event first system port 164 and/or third system port 170 are unable to service the first actuator.

As spool 116 moves toward first end 118 during the backup operational mode of transfer valve 110, first land 128 of spool 116 will move away from second centering port 162, causing second centering port 162 to be open to second cavity 146a. Second centering port 162 has a smaller cross-sectional flow area than second control port 158a and third control port 158b, or includes an orifice with a smaller cross-sectional flow area than second control port 158a and third control port 158b, such that bleed flow through second centering port 162 is too small to prevent the pressure in second cavity 146a and third cavity 146b from effecting movement of spool 116 toward first end 118 of housing 112.

In the example of FIG. 6B, second control port 158a and third control port 158b have both been deliberately connected to a low-pressure source (such as the pressure return) while first control port 156 is connected to a higher-pressure source than second control port 158a and third control port 158b. With the second control port 158a and third control port 158*b* both connected to the low-pressure source and first control port 156 connected to the higher-pressure source, the pressure in first cavity 144 pushes spool 116 toward second end 120 of housing 112. As spool 116 moves toward second end 120, spool 116 causes second cavity 146*a* to drain through second control port 158*a* and causes third cavity 146*b* to drain through third control port 158*b*. As spool 116 moves toward second end 120, fourth land 134 and fifth land 136 can modulate or block flow to and from the second actuator by partially closing or fully closing at least one of second system port 166 and second actuator port 170, and by partially closing or fully closing at least one of fourth system port 174 and fourth actuator port 178. As spool 116 moves toward second end 120, fourth land 134 can block second system port 166 from second actuator port 170 while first window 148 fluidically connects first system port 164 to second actuator port 170 to take over control of the second actuator (not shown) and still maintain control of the first actuator (not shown). As spool 116 moves toward second end 120, fifth land 136 can block fourth system port 174 from fourth actuator port 178 while third window 152 fluidically connects third system port 172 to fourth actuator port 178 to take over control of the second actuator and still maintain control of the first actuator in the event third system port 166 and/or fourth system port 172 are unable to service the second actuator.

As spool 116 moves toward second end 120 during the backup operational mode of transfer valve 110, first land 128 of spool 116 will move away from first centering port 160, causing first centering port 160 to be open to first cavity 144. First centering port 160 has a smaller cross-sectional flow area than first control port 156, or includes an orifice with a smaller cross-sectional flow area than first control port 156, such that bleed flow through first centering port 160 is too small to prevent the pressure in first cavity 144 from effecting movement of spool 116 toward second end 120 of housing 112. The backup operational mode of transfer 110 can be used to control flow to and from the first actuator and the second actuator when an actuator control valve fails or malfunctions, or when additional control of flow to and from the first actuator and/or the second actuator is required. As disclosed below with reference to FIGS. 7A-8B, solenoid valves or an electrohydraulic servo valve can be used to switch transfer valve 110 between the standby operational mode and the backup operational mode.

Figure 7A:
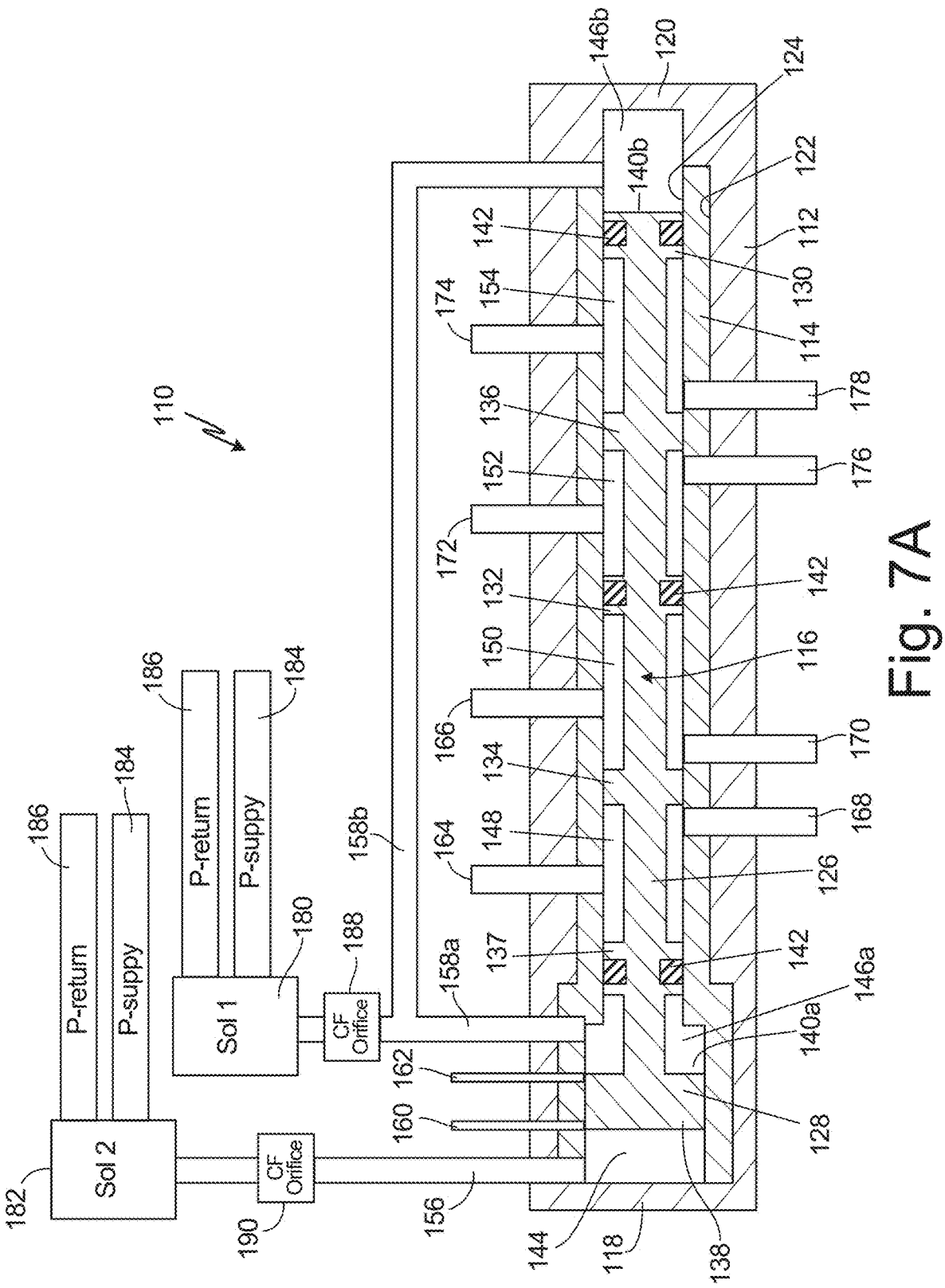
FIG. 7A is a schematic cross-sectional view of the transfer valve from FIG. 5 connected to a pressure supply and a pressure return by a first solenoid valve and a second solenoid valve.

FIG. 7A is a schematic cross-sectional view of the example of transfer valve 110 from FIG. 5 connected to pressure supply 184 and pressure return 186 by first solenoid valve 180 and second solenoid valve 182. Pressure supply 184 can be a pressurized fluid that is supplied by a pump and that is at a higher pressure than pressure return 186. Pressure return 186 can be a tank or reservoir that is at a lower pressure than pressure supply 184. As shown in FIG. 7A, First solenoid valve 180 is fluidically connected to second control port 158*a*, third control port 158*b*, pressure supply 184, and pressure return 186. Second solenoid valve 182 is fluidically connected to first control port 156, pressure supply 184, and pressure return 186.

When transfer valve 110 is in the standby operational mode (as shown in FIGS. 5 and 7, first solenoid valve 180 fluidically connects both second control port 158*a* and third control port 158*b* to pressure supply 184 while second solenoid valve 182 fluidically connects first control port 156 to pressure supply 184. With all of first control port 156, second control port 158*a*, and third control port 158*b* connected to pressure supply 184, the pressure in first cavity 44 is equal to the pressure in second cavity 146*a* and third cavity 146*b*, and spool 116 is in the centered position within housing 112. First centering port 160 and second centering port 162 can both be fluidically connected to pressure return 186 to bleed pressure out transfer valve 110 if spool 116 shifts out of the centered position while transfer valve 110 is in the standby operational mode. To shift transfer valve 110 from the standby operational mode to the backup operational mode, a command can be sent to one of first solenoid valve 180 or second solenoid valve 182 to connect first control port 156 to pressure return 186 or second control port 158*a* and third control port 158*b* to pressure return 86, thereby creating a pressure differential between first cavity 144 and both second cavity 146*b* and third cavity 146*b* that causes spool 116 to move within housing 112 of transfer valve 110. First orifice 188 can be provided fluidically between first solenoid 180 and second control port 158*a* and third control port 158*b* to control the speed of flow in and out of second cavity 146*a* and third cavity 146*b* and to control the speed at which spool 116 responds and moves within housing 112. Second orifice 190 can be provided fluidically between second solenoid 182 and first control port 156 to control the speed of flow in and out of first cavity 144 and to also control the speed at which spool 116 responds and moves within housing 112.

Figure 7B:
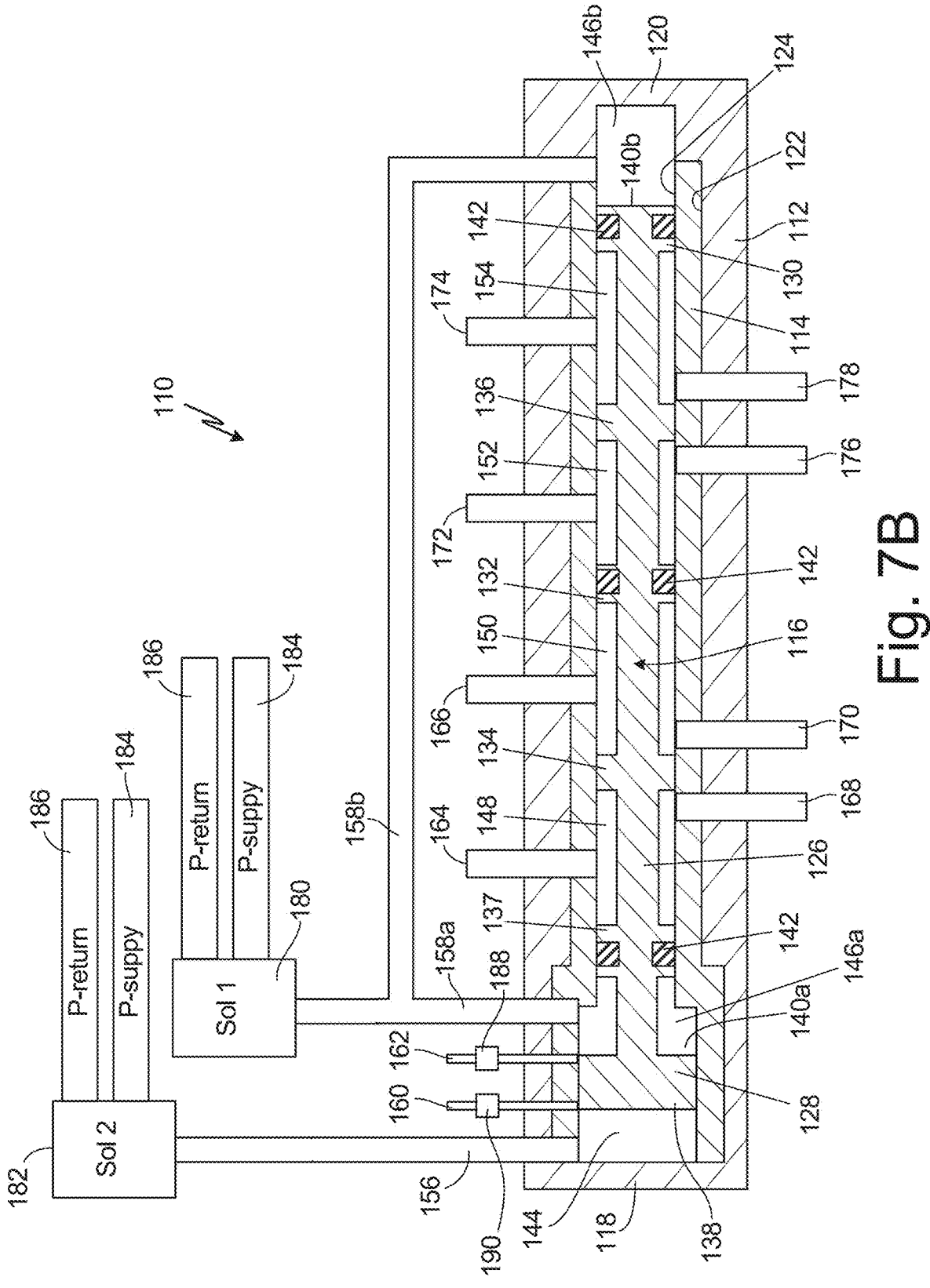
FIG. 7B is another schematic cross-sectional view of the transfer valve from FIG. 5 connected to a pressure supply and a pressure return by a first solenoid valve and a second solenoid valve.

FIG. 7B is another schematic cross-sectional view of transfer valve 110 from FIG. 5 connected to pressure supply 184 and pressure return 186 by first solenoid valve 180 and second solenoid valve 182. The example of FIG. 7B is similar to the example of FIG. 7A except first orifice 188 can be provided fluidically between second centering port 162 and pressure return 186, and second orifice 190 can be provided fluidically between first centering port 160 and pressure return 186. In the example of FIG. 7B, no orifices are present between first solenoid valve 180 and second control port 158*a* or third control port 158*b*. Also, no orifices are present between second solenoid valve 182 and first control port 156. Since orifices 188 and 190 are downstream of transfer valve 110, first solenoid valve 180, and second solenoid valve 182, the orifices 188 and 190 in the example of FIG. 7B do not slow down the transfer time of transfer valve 110 during the backup operational mode. Orifices 188 and 190 also manage the rate of leakage from first cavity 144 and second cavity 146*a* such that the rate of leakage is not so great as to impact control of transfer valve 110 during the backup operational mode, but still sufficient to provide centering of spool 116 during the standby operational mode.

Figure 8A:
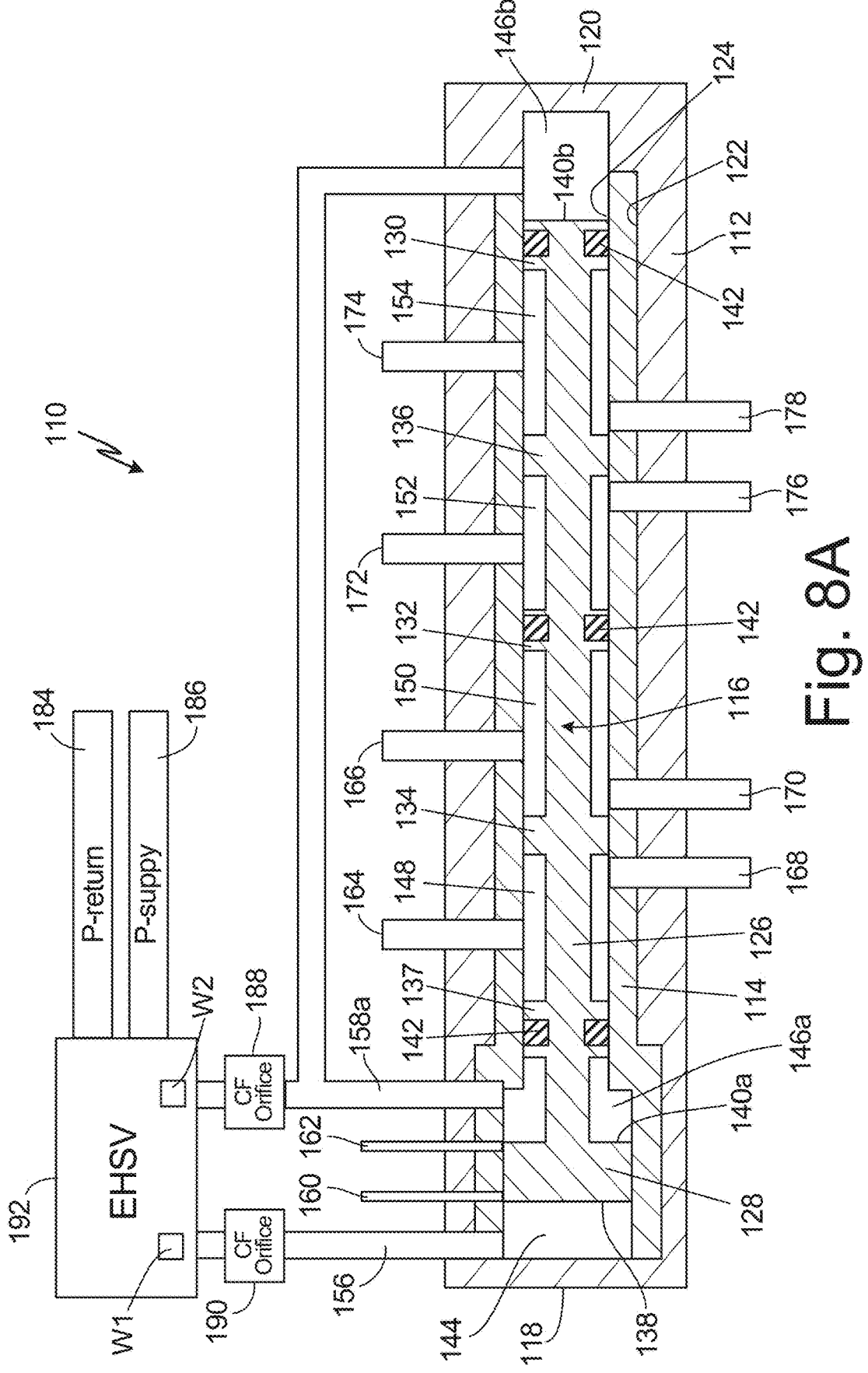
FIG. 8A is a schematic cross-sectional view of the transfer valve from FIG. 5 connected to a pressure supply and a pressure return by an electrohydraulic servo valve.

FIG. 8A is a schematic cross-sectional view of transfer valve 110 from FIG. 5 connected to pressure supply 184 and pressure return 186 by electrohydraulic servo valve (EHSV) 192. As shown in the example of FIG. 8A, EHSV 192 is fluidically connected to first control port 156, second control port 158*a*, third control port 158*b*, pressure supply 184, and pressure return 186. When transfer valve 110 is in the standby operational mode (as shown in FIGS. 5 and 8), EHSV 192 fluidically connects all of first control port 156, second control port 158*a*, and third control port 158*b* to pressure supply 184. With first control port 156, second control port 158*a*, and third control port 158*b* connected to pressure supply 184, the pressure in first cavity 144 is equal to the pressure in both second cavity 146*a* and third cavity 146*b*, and spool 116 is in the centered position within housing 112. First centering port 160 and second centering port 162 can both be fluidically connected to pressure return 186 to bleed pressure out transfer valve 110 if spool 116 shifts out of the centered position while transfer valve 110 is in the standby operational mode. To shift transfer valve 110 from the standby operational mode to the backup operational mode, a command can be sent to EHSV 192 to connect first control port 156 to pressure return 86 or connect second control port 158a and third control port 158b to pressure return 186, thereby creating a pressure differential between first cavity 144 and second cavity 146 that causes spool 116 to move within housing 112 of transfer valve 110. First orifice 188 can be provided fluidically between EHSV 192 and second control port 158a and third control port 158b to control the speed of flow in and out of second cavity 146a and third cavity 146b and to control the speed at which spool 116 responds and moves within housing 112. Second orifice 190 can be provided fluidically between EHSV 192 and first control port 156 to control the speed of flow in and out of first cavity 144 and to also control the speed at which spool 116 responds and moves within housing 112. In other examples, under-lapped windows or separate orifices in EHSV 192 can be used to fluidically connect first control port 156 to pressure supply 184 and/or to pressure return 186, and to fluidically connect second control port 158a and third control port 158b to pressure supply 184 and/or to pressure return 186 in response to a null current command to EHSV 192. First window W1 of EHSV 192 can fluidically connect first control port 156 to pressure supply 184 and/or to pressure return 186. In place of second orifice 190, first window W1 can be under-lapped or include an orifice to produce the same benefit of second orifice 190. Second window W2 of EHSV 192 can fluidically connect second control port 158a and third control port 158b to pressure supply 184 and/or to pressure return 186. In place of first orifice 188, second window W2 can be under-lapped or include an orifice to produce the same benefit of first orifice 188.

Figure 8B:
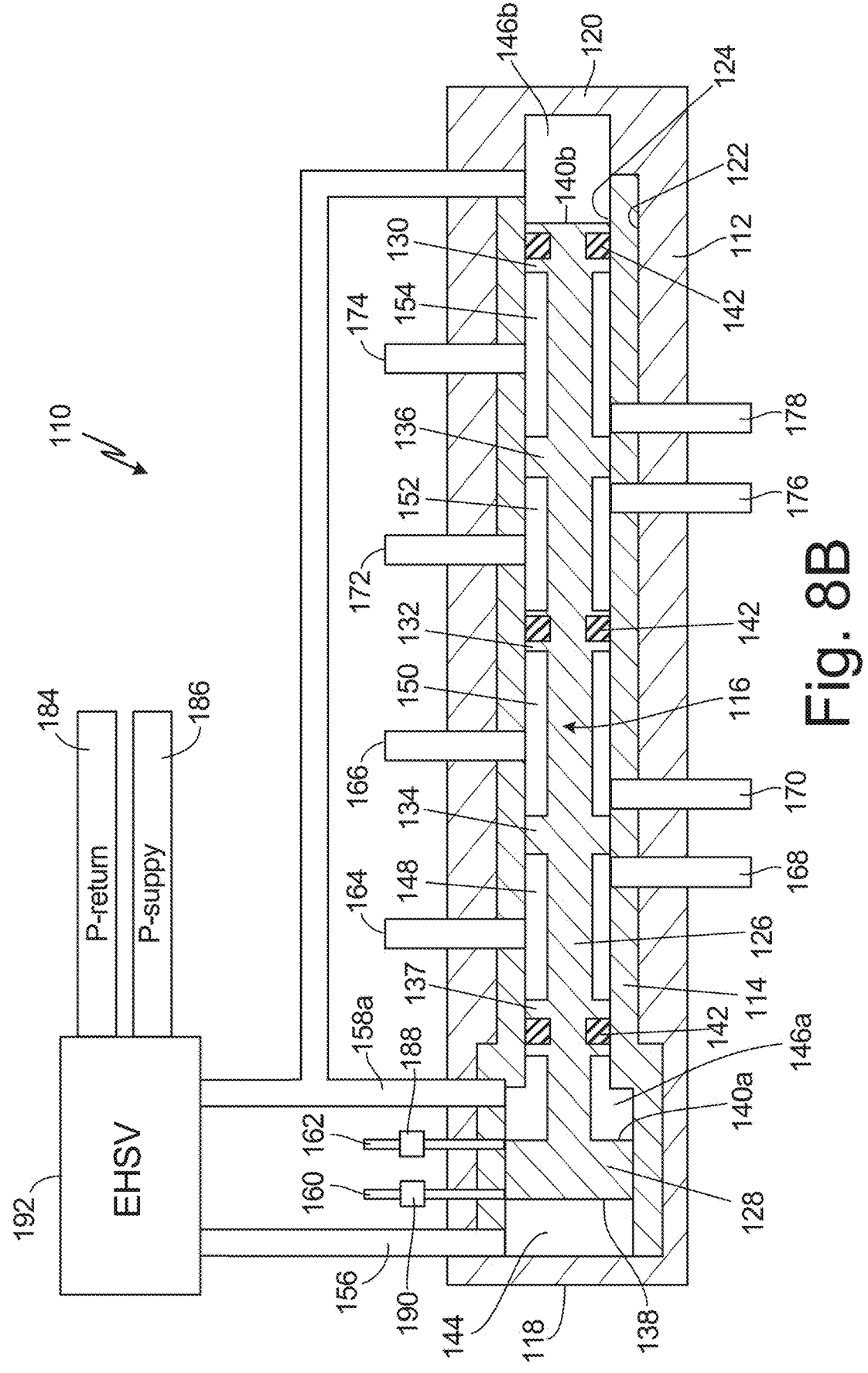
FIG. 8B is another schematic cross-sectional view of the transfer valve from FIG. 5 connected to a pressure supply and a pressure return by an electrohydraulic servo valve.

FIG. 8B is another schematic cross-sectional view of transfer valve 110 from FIG. 5 connected to pressure supply 184 and pressure return 186 by EHSV 192. The example of FIG. 8B is similar to the example of FIG. 8A except first orifice 188 can be provided fluidically between second centering port 162 and pressure return 186, and second orifice 190 can be provided fluidically between first centering port 160 and pressure return 186. In the example of FIG. 8B, no orifices are present between EHSV 192 and second control port 158a or third control port 158b. Also, no orifices are present between EHSV 192 and first control port 156. Since orifices 188 and 190 are downstream of transfer valve 110 and EHSV 192, the orifices 188 and 190 in the example of FIG. 8B do not slow down the transfer time of transfer valve 110 during the backup operational mode. Orifices 188 and 190 also manage the rate of leakage from first cavity 144 and second cavity 146a such that the rate of leakage is not so great as to impact control of transfer valve 110 during the backup operational mode, but still sufficient to provide centering of spool 116 during the standby operational mode.

Discussion of Possible Embodiments

The following are non-exclusive descriptions of possible embodiments of the present invention.

In one aspect of the disclosure, a transfer valve includes a housing extending axially from a first end to a second end along a center axis of the transfer valve. A spool is in the housing and includes a first control surface facing toward the first end of the housing and a second control surface facing toward the second end of the housing. A first cavity is formed by the housing and the first control surface. A second cavity is formed by the housing and the second control surface. A first control port extends through the housing and is fluidically connected to the first cavity. A second control port extends through the housing and is fluidically connected to the second cavity. A first centering port extends through the housing and is axially between the first control port and the second control port. A second centering port extends through the housing and is axially between the first centering port and the second control port. The spool is configured to block and close the first centering port and the second centering port in a centered position of the spool. The first centering port is fluidically connected to the first control port by the first cavity or the second centering port is fluidically connected to the second control port by the second cavity in a non-centered position of the spool.

The transfer valve of the preceding paragraph can optionally include, additionally and/or alternatively, any one or more of the following features, configurations and/or additional components in the paragraphs below.

In an embodiment of the foregoing transfer valve, a pressure in the first centering port is configured to never exceed a pressure in the first control port, and a pressure in the second centering port is configured to never exceed a pressure in the second control port.

In an embodiment of the foregoing transfer valve, the spool further comprises: a first land forming a first end of the spool, wherein the first control surface is formed by the first land; a second land axially spaced from the first land relative to the center axis and forming a second end of the spool, wherein the second control surface is formed by the second land; and a shaft extending axially between the first land and the second land, wherein the shaft is smaller in diameter than the first land and the second land, and wherein the shaft is connected to the first land and the second land, and wherein the first land is configured to block and close the first centering port in the centered position; and wherein the second land is configured to block and close the second centering port in the centered position.

In an embodiment of the foregoing transfer valve, the spool further comprises: a third land connected to the shaft and axially between the first land and the second land; a first valve window axially between the first land and the third land; and a second valve window axially between the second land and the third land.

In an embodiment of the foregoing transfer valve, the transfer valve further comprises: a system extend port extending through the housing and, in the centered position of the spool, is fluidically connected with the first valve window; an actuator extend port extending through the housing and, in the centered position of the spool, is fluidically connected with the first valve window; an actuator retract port extending through the housing and, in the centered position of the spool, is fluidically connected with the second valve window; and a system retract port extending through the housing and, in the centered position of the spool, is fluidically connected with the second valve window.

In an embodiment of the foregoing transfer valve, the first land, the second land, and the third land are each equal in diameter to one another relative to the center axis, and the shaft is smaller in diameter than the first land, the second land, and the third land.

In an embodiment of the foregoing transfer valve, a system includes the transfer valve and further comprises: a high-pressure supply line; a low-pressure return line; and a control valve fluidically connected to the high-pressure supply line and the low-pressure return line, and wherein the control valve fluidically connects the high-pressure supply line and the low-pressure return line to the first control port.

In an embodiment of the foregoing transfer valve, the control valve is configured to fluidically connect the high-pressure supply line and the low-pressure return line to the second control port.

In an embodiment of the foregoing transfer valve, the system further comprises: a first orifice fluidically connecting the second centering port to the low-pressure return line; and a second orifice fluidically connecting the first centering port to the low-pressure return line, and wherein the control valve is an electrohydraulic servo valve (EHSV) or a solenoid valve.

In an embodiment of the foregoing transfer valve, the system further comprises: an actuator control valve fluidically connected to the system extend port and the system retract port; and an actuator fluidically connected to the actuator extend port and the actuator retract port.

In an embodiment of the foregoing transfer valve, the transfer valve further comprises: the spool further comprises: a first land forming a first end of the spool, wherein the first control surface forms a first side of the first land, and wherein the second control surface forms a second side of the first land; a second land axially spaced from the first land relative to the center axis and forming a second end of the spool; a third land axially between the first land and the second land; a fourth land axially between the third land and the first land; and a shaft extending axially between the first land and the second land, wherein the shaft is smaller in diameter than the first land, the second land, the third land, and the fourth land, and wherein the shaft is connected to the first land, the second land, the third land, and the fourth land, and wherein the first land is configured to block and close the first centering port and the second centering port in the centered position of the spool.

In an embodiment of the foregoing transfer valve, the spool further comprises: a first valve window axially between the fourth land and the third land; and a second valve window axially between the third land and the second land.

In an embodiment of the foregoing transfer valve, the transfer valve further comprises: a system extend port extending through the housing and fluidically connected with the first valve window in the centered position of the spool; an actuator extend port extending through the housing and fluidically connected with the first valve window in the centered position of the spool; an actuator retract port extending through the housing and fluidically connected with the second valve window in the centered position of the spool; and a system retract port extending through the housing and fluidically connected with the second valve window in the centered position of the spool.

In an embodiment of the foregoing transfer valve, the second land, the third land, and the fourth land are each equal in diameter to one another relative to the center axis, the shaft is smaller in diameter than the first land, the second land, and the third land, and the first land is larger in diameter than the second land, the third land, and the fourth land.

In an embodiment of the foregoing transfer valve, a system comprises the transfer and the system further comprises: a high-pressure supply line; a low-pressure return line; and a control valve fluidically connected to the high-pressure supply line and the low-pressure return line, wherein the control valve fluidically connects the high-pressure supply line and the low-pressure return line to the first control port, and wherein the control valve fluidically connects the high-pressure supply line and the low-pressure return line to the second control port.

In an embodiment of the foregoing transfer valve, the control valve is an electrohydraulic servo valve (EHSV) or a solenoid valve, and wherein the control valve comprises: a first under-lapped window fluidically connecting the first control port to the high-pressure supply line and the low-pressure return line; and a second under-lapped window fluidically connecting the second control port to the high-pressure supply line and the low-pressure return line.

In an embodiment of the foregoing transfer valve, the system further comprises: a first orifice fluidically connecting the second control port to the high-pressure supply line and the low-pressure return line; and a second orifice fluidically connecting the first control port to the high-pressure supply line and the low-pressure return line.

In another aspect of the disclosure, a method is disclosed of operating a transfer valve. The method includes maintaining a spool of the transfer valve in a centered position. Maintaining the spool of the transfer valve in the centered position includes: fluidically connecting a first pressure source to a first control port that is fluidically connected to a first cavity and a first control surface of a spool of the transfer valve; fluidically connecting the first pressure source to a second control port that is fluidically connected to a second cavity and a second control surface of the spool; uncovering a first centering port and fluidically connecting the first cavity to the first centering port when the spool shifts out of the centered position and when the second control surface moves toward the second control port and when the first control surface moves away from the first control port, wherein the first centering port is fluidically connected to a second pressure source that is lower in pressure than the first pressure source; and uncovering a second centering port and fluidically connecting the second cavity to the second centering port when the spool shifts out of the centered position and when the first control surface moves toward the first control port and when the second control surface moves away from the second control port, wherein the second centering port is fluidically connected to the second pressure source.

The method of the preceding paragraph can optionally include, additionally and/or alternatively, any one or more of the following features, configurations and/or additional components in the paragraphs below.

In an embodiment of the foregoing method, the method further comprises transitioning the transfer valve to a backup mode to control a working flow through the transfer valve to an actuator, wherein transitioning the transfer valve to the backup mode comprises: fluidically connecting the first control port to the second pressure source; and maintaining the second control port in fluidic connection with the first pressure source.

In another aspect of the disclosure a transfer valve includes a housing extending axially from a first end to a second end along a center axis of the transfer valve. A spool in the housing includes a first control surface facing toward the first end of the housing and a second control surface facing toward the second end of the housing. A first cavity is in the housing and is axially between the first control surface and the first end of the housing. A second cavity is in the housing and is axially between the second control surface and the second end of the housing. A first control port is axially between the first end of the housing and the first control surface and extends through the housing to fluidically connect to the first cavity. A second control port is axially between the second end of the housing and the second control surface and extends through the housing to fluidically connect to the second cavity. A first centering port extends through the housing and is axially between the first control port and the second control port. A second centering port extends through the housing and is axially between the first centering port and the second control port. The spool is configured to block and close the first centering port and the second centering port in a centered position of the spool. The first centering port is fluidically connected to the first cavity or the second centering port is fluidically connected to the second cavity when the spool is not in the centered position.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A transfer valve comprising:
a housing extending axially from a first end to a second end along a center axis of the transfer valve;
a spool in the housing, wherein the spool comprises:
  a first control surface facing toward the first end of the housing; and
  a second control surface facing toward the second end of the housing;
a first cavity formed by the housing and the first control surface;
a second cavity formed by the housing and the second control surface;
a first control port extending through the housing and fluidically connected to the first cavity;
a second control port extending through the housing and fluidically connected to the second cavity;
a first centering port extending through the housing and axially between the first control port and the second control port; and
a second centering port extending through the housing and axially between the first centering port and the second control port, and
wherein the spool is configured to block and close the first centering port and the second centering port in a centered position of the spool, and
wherein the first centering port is fluidically connected to the first control port by the first cavity or the second centering port is fluidically connected to the second control port by the second cavity in a non-centered position of the spool.

2. The transfer valve of claim 1, wherein a pressure in the first centering port is configured to never exceed a pressure in the first control port, and a pressure in the second centering port is configured to never exceed a pressure in the second control port.

3. The transfer valve of claim 2, wherein the spool further comprises:
a first land forming a first end of the spool, wherein the first control surface is formed by the first land;
a second land axially spaced from the first land relative to the center axis and forming a second end of the spool, wherein the second control surface is formed by the second land; and
a shaft extending axially between the first land and the second land, wherein the shaft is smaller in diameter than the first land and the second land, and wherein the shaft is connected to the first land and the second land, and
wherein the first land is configured to block and close the first centering port in the centered position; and
wherein the second land is configured to block and close the second centering port in the centered position.

4. The transfer valve of claim 3, wherein the spool further comprises:
a third land connected to the shaft and axially between the first land and the second land;
a first valve window axially between the first land and the third land; and
a second valve window axially between the second land and the third land.

5. The transfer valve of claim 4, wherein the transfer valve further comprises:
a system extend port extending through the housing and, in the centered position of the spool, is fluidically connected with the first valve window;
an actuator extend port extending through the housing and, in the centered position of the spool, is fluidically connected with the first valve window;
an actuator retract port extending through the housing and, in the centered position of the spool, is fluidically connected with the second valve window; and
a system retract port extending through the housing and, in the centered position of the spool, is fluidically connected with the second valve window.

6. The transfer valve of claim 5, wherein the first land, the second land, and the third land are each equal in diameter to one another relative to the center axis, and the shaft is smaller in diameter than the first land, the second land, and the third land.

7. A system comprising the transfer valve of claim 5, further comprising:
a high-pressure supply line;
a low-pressure return line; and
a control valve fluidically connected to the high-pressure supply line and the low-pressure return line, and wherein the control valve fluidically connects the high-pressure supply line and the low-pressure return line to the first control port.

8. The system of claim 7, wherein the control valve fluidically connects the high-pressure supply line and the low-pressure return line to the second control port.

9. The system of claim 8, further comprising:
a first orifice fluidically connecting the second centering port to the low-pressure return line; and
a second orifice fluidically connecting the first centering port to the low-pressure return line, and
wherein the control valve is an electrohydraulic servo valve (EHSV) or a solenoid valve.

10. The system of claim 7, further comprising:
an actuator control valve fluidically connected to the system extend port and the system retract port; and
an actuator fluidically connected to the actuator extend port and the actuator retract port.

11. The transfer valve of claim 2, wherein the spool further comprises:
a first land forming a first end of the spool, wherein the first control surface forms a first side of the first land, and wherein the second control surface forms a second side of the first land;
a second land axially spaced from the first land relative to the center axis and forming a second end of the spool;

a third land axially between the first land and the second land;

a fourth land axially between the third land and the first land; and a shaft extending axially between the first land and the second land, wherein the shaft is smaller in diameter than the first land, the second land, the third land, and the fourth land, and wherein the shaft is connected to the first land, the second land, the third land, and the fourth land, and wherein the first land is configured to block and close the first centering port and the second centering port in the centered position of the spool.

12. The transfer valve of claim 11, wherein the spool further comprises:

a first valve window axially between the fourth land and the third land; and a second valve window axially between the third land and the second land.

13. The transfer valve of claim 12, wherein the transfer valve further comprises:

a system extend port extending through the housing and fluidically connected with the first valve window in the centered position of the spool;

an actuator extend port extending through the housing and fluidically connected with the first valve window in the centered position of the spool;

an actuator retract port extending through the housing and fluidically connected with the second valve window in the centered position of the spool; and a system retract port extending through the housing and fluidically connected with the second valve window in the centered position of the spool.

14. The transfer valve of claim 13, wherein the second land, the third land, and the fourth land are each equal in diameter to one another relative to the center axis, the shaft is smaller in diameter than the first land, the second land, and the third land, and the first land is larger in diameter than the second land, the third land, and the fourth land.

15. A system comprising the transfer valve of claim 13, further comprising:

a high-pressure supply line;

a low-pressure return line; and a control valve fluidically connected to the high-pressure supply line and the low-pressure return line, wherein the control valve fluidically connects the high-pressure supply line and the low-pressure return line to the first control port, and wherein the control valve fluidically connects the high-pressure supply line and the low-pressure return line to the second control port.

16. The system of claim 15, wherein the control valve is an electrohydraulic servo valve (EHSV) or a solenoid valve, and wherein the control valve comprises:

a first under-lapped window fluidically connecting the first control port to the high-pressure supply line and the low-pressure return line; and a second under-lapped window fluidically connecting the second control port to the high-pressure supply line and the low-pressure return line.

17. The system of claim 15, further comprising:

a first orifice fluidically connecting the second control port to the high-pressure supply line and the low-pressure return line; and a second orifice fluidically connecting the first control port to the high-pressure supply line and the low-pressure return line.

18. A method of operating a transfer valve comprises:

maintaining a spool of the transfer valve in a centered position, wherein maintaining the spool of the transfer valve in the centered position comprises:

fluidically connecting a first pressure source to a first control port that is fluidically connected to a first cavity and a first control surface of a spool of the transfer valve;

fluidically connecting the first pressure source to a second control port that is fluidically connected to a second cavity and a second control surface of the spool;

uncovering a first centering port and fluidically connecting the first cavity to the first centering port when the spool shifts out of the centered position and when the second control surface moves toward the second control port and when the first control surface moves away from the first control port, wherein the first centering port is fluidically connected to a second pressure source that is lower in pressure than the first pressure source; and uncovering a second centering port and fluidically connecting the second cavity to the second centering port when the spool shifts out of the centered position and when the first control surface moves toward the first control port and when the second control surface moves away from the second control port, wherein the second centering port is fluidically connected to the second pressure source.

19. The method of claim 18, further comprising:

transitioning the transfer valve to a backup mode to control a working flow through the transfer valve to an actuator, wherein transitioning the transfer valve to the backup mode comprises:

fluidically connecting the first control port to the second pressure source; and maintaining the second control port in fluidic connection with the first pressure source.

20. A transfer valve comprising:

a housing extending axially from a first end to a second end along a center axis of the transfer valve;

a spool in the housing, wherein the spool comprises:

a first control surface facing toward the first end of the housing; and a second control surface facing toward the second end of the housing;

a first cavity in the housing and axially between the first control surface and the first end of the housing;

a second cavity in the housing and axially between the second control surface and the second end of the housing;

a first control port axially between the first end of the housing and the first control surface and extending through the housing to fluidically connect to the first cavity;

a second control port axially between the second end of the housing and the second control surface and extending through the housing to fluidically connect to the second cavity;

a first centering port extending through the housing and axially between the first control port and the second control port; and a second centering port extending through the housing and axially between the first centering port and the second control port, and wherein the spool is configured to block and close the first centering port and the second centering port in a centered position of the spool, and wherein the first centering port is fluidically connected to the first cavity or the second centering port is fluidically connected to the second cavity when the spool is not in the centered position.

* * * * *